US011652769B2

United States Patent
(12) United States Patent
Weiss et al.

(10) Patent No.: US 11,652,769 B2
(45) **Date of Patent: *May 16, 2023**

(54) SNIPPET(S) OF CONTENT ASSOCIATED WITH A COMMUNICATION PLATFORM

(71) Applicant: Salesforce, Inc., San Francisco, CA (US)

(72) Inventors: Noah Weiss, Austin, TX (US); John Rodgers, Vancouver (CA); Kevin Marshall, San Francisco, CA (US); Anna Niess, Hastings-on-Hudson, NY (US); Michael Hahn, San Francisco, CA (US); Ibrahim Madha, Los Angeles, CA (US); Pedro Carmo, Brooklyn, NY (US); Michael Montazeri, Brooklyn, NY (US); Ethan Eismann, Orinda, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/508,738

(22) Filed: Oct. 22, 2021

(65) Prior Publication Data

US 2022/0109650 A1 Apr. 7, 2022

Related U.S. Application Data

(63) Continuation of application No. 17/064,161, filed on Oct. 6, 2020, now Pat. No. 11,178,088.

(51) Int. Cl.

*H04L 51/212* (2022.01)
*H04L 51/10* (2022.01)

(Continued)

(52) U.S. Cl.

CPC ............ *H04L 51/212* (2022.05); *H04L 51/04* (2013.01); *H04L 51/10* (2013.01); *H04L 51/216* (2022.05)

(58) Field of Classification Search

CPC ....... H04L 51/212; H04L 51/04; H04L 51/10; H04L 51/216; H04L 12/1859; H04L 51/214; H04L 51/52

See application file for complete search history.

(56) References Cited

U.S. PATENT DOCUMENTS 6,119,147 A 9/2000 Toomey et al.
11,061,547 B1 7/2021 Fieldman (Continued)

OTHER PUBLICATIONS

Youtube, "Microsoft Mechanics. How to use Microsoft Teams, a Demo Tutorial", retrieved at <<www.youtube.com/watch?v=CH2seLS5Wb0>>, 2019, 38 pgs.

(Continued)

*Primary Examiner* — Austin J Moreau
(74) *Attorney, Agent, or Firm* — Lee & Hayes, P.C.

(57) ABSTRACT

Snippets of content associated with a communication platform are described. In an example, based at least in part on a determination, by the communication platform, that a user of the communication platform is permitted to access one or more snippets of content provided by one or more other users of the communication platform, causing one or more user interface elements associated with the one or more snippets of content to be presented via a user interface of a user computing device of the user. The communication platform can receive, from the user computing device, a request to view a snippet of content of the one or more snippets of content and can cause the snippet of content to be presented by the user computing device via the user interface associated with the communication platform.

20 Claims, 14 Drawing Sheets

(51) Int. Cl.
*H04L 51/04* (2022.01)
*H04L 51/216* (2022.01)

(56) References Cited

U.S. PATENT DOCUMENTS

| | | | |
|---|---|---|---|
| 11,265,183 | B1 | 3/2022 | Iyer et al. |
| 2002/0160350 | A1 | 10/2002 | Tanaka et al. |
| 2006/0053380 | A1 | 3/2006 | Spataro et al. |
| 2006/0080432 | A1 | 4/2006 | Spataro et al. |
| 2008/0263010 | A1 | 10/2008 | Roychoudhuri et al. |
| 2009/0150784 | A1 | 6/2009 | Denney et al. |
| 2010/0070503 | A1 | 3/2010 | Abraham |
| 2013/0080224 | A1 | 3/2013 | O'Brien et al. |
| 2013/0262410 | A1 | 10/2013 | Liu et al. |
| 2015/0100503 | A1 | 4/2015 | Lobo et al. |
| 2015/0248222 | A1 | 9/2015 | Stickler et al. |
| 2016/0277341 | A1 | 9/2016 | Garen |
| 2017/0142055 | A1* | 5/2017 | Martinazzi ............ G06F 3/0481 |
| 2017/0249580 | A1 | 8/2017 | Newman et al. |
| 2017/0371527 | A1* | 12/2017 | Morichère-Matte ......................... G06Q 10/107 |
| 2018/0121849 | A1* | 5/2018 | Torres ............. G06Q 10/06313 |
| 2018/0287982 | A1 | 10/2018 | Draeger et al. |
| 2018/0302233 | A1 | 10/2018 | Viera et al. |
| 2018/0373415 | A1 | 12/2018 | Dellinger et al. |
| 2020/0234243 | A1 | 7/2020 | Miron et al. |
| 2020/0296147 | A1* | 9/2020 | Eliason ................. H04L 65/403 |
| 2021/0133681 | A1* | 5/2021 | Dhaliwal ............. G06Q 10/101 |
| 2022/0368660 | A1 | 11/2022 | Niess et al. |

OTHER PUBLICATIONS

Youtube, "Teachers Tech. Learn how to use Microsoft Teams—Beginners Tutorial", retrieved at <<www.youtube.com/watch?v=bAesljrem7E>>, 2020, 41 Pages.

"About Stories", retrieved on Oct. 7, 2020, at <<https://support.snapchat.com/en-US/a/about-stories>>, 3 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Moreau, Elise, "What is a Snapchat Story", retrieved on Oct. 7, 2020 at <<https://www.lifewire.com/what-is-a-snapchat-story-3486000>>, 9 pages.

Office Action for U.S. Appl. No. 17/064,161, dated Apr. 6, 2021, Weiss, "Snippet(s) of Content Associated With a Communication Platform", 27 Pages.

Office Action for U.S. Appl. No. 17/320,620, dated Nov. 15, 2021, Niess, "Asynchronous Collaboration in a Communication Platform", 12 pages.

Office Action for U.S. Appl. No. 17/064,161, dated Dec. 18, 2020, Weiss, "Snippet(s) of Content Associated With a Communication Platform", 23 Pages.

Office Action for U.S. Appl. No. 17/320,620, dated Jul. 26, 2021, Niess, "Asynchronous Collaboration in a Communication Platform", 10 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Read, Ash, "Facebook Stories: Everything You Need to Know About Faceboo* s Latest Feature", retrieved on Oct. 7, 2020 at <<https://buffer.com/library/facebook-stories/>>, 15 pages.

Read, Ash, "Instagram Stories: The Complete Guide to Using Stories", retrieved on Oct. 7, 2020 at <<https://buffer.com/library/instagram-stories/>>, 33 pages.

Emie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Tillman, Maggie, "What are Instagram Stories and how do they work?", retrieved on Oct. 7, 2020, at <<https://www.pocket-lint.com/apps/news/instagram/138416-what-is-instagram-stories-and-how-does-it-work>>, 10 pages.

Jonathan Vanian, "Why these startups think chat apps are the next big thing in workplace collaboration", Gigaom, LexisNexis, https://advance.lexis.com/api/pemnalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 17/320,620, dated Mar. 18, 2022, Niess, "Asynchronous Collaboration in a Communication Platform", 16 pages.

Office Action for U.S. Appl. No. 17/320,620, dated Jul. 15, 2022, Niess, "Asynchronous Collaboration in a Communication Platform", 14 pages.

* cited by examiner

SNIPPET(S) OF CONTENT ASSOCIATED WITH A COMMUNICATION PLATFORM

RELATED APPLICATIONS

This application claims priority to and is a continuation of U.S. patent application Ser. No. 17/064,161, filed on Oct. 6, 2020, the entire contents of which are incorporated herein by reference.

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based platform and/or hub for facilitating communication between and among users. In some examples, data associated with a communication channel can be presented via a user interface. In some examples, the user interface can present a data feed indicating messages posted to and/or actions taken with respect to a particular communication channel. In some examples, such a data feed can include so many messages and/or indications of actions taken with respect to a particular communication channel, that digesting the data associated with the communication channel can be overwhelming, time consuming, and inefficient.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
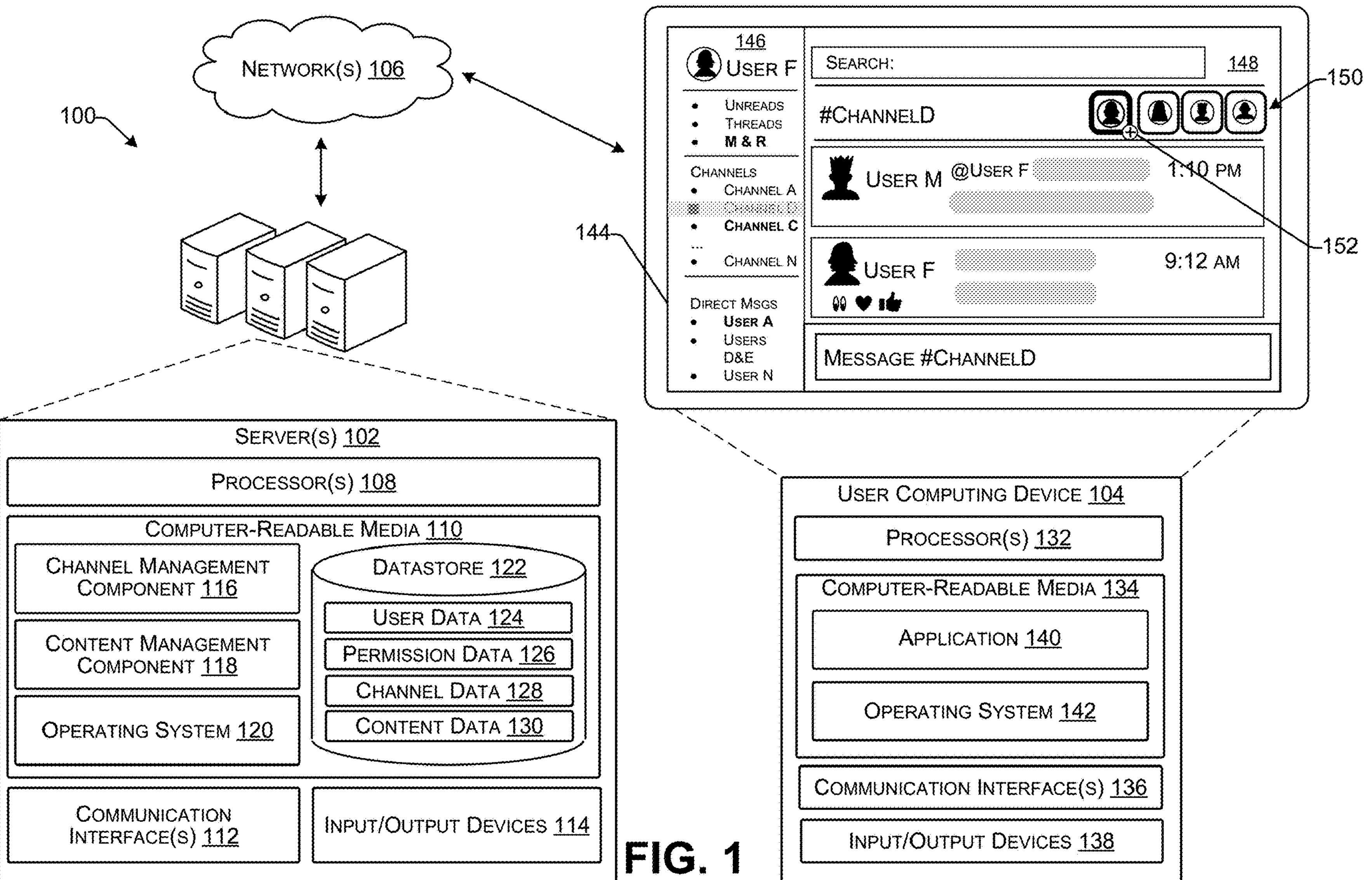
FIG. 1 illustrates an example environment for performing techniques described herein.

Snippets of content associated with a communication platform are described. A communication platform, which, in some examples can be a group-based communication platform, a channel-based communication platform, a permission-based communication platform, channel-based messaging platform, and/or any other platform for facilitating communication between and among users, can enable users to create snippets of content for presenting via the communication platform. In at least one example, a snippet of content can comprise audio content, haptic content, image content, and/or video content. In some examples, a snippet of content can be ephemeral, such that the snippet of content is available for viewing for a predetermined period of time, after which the snippet of content is no longer available for viewing. In some examples, snippets of content can be available for consumption asynchronously, such that individual users can view the snippets of content at different times (e.g., on their own time, so long as the snippet of content is still available). That is, techniques described herein relate to receiving and presenting snippets of content that are consumable asynchronously by users of a communication platform.

In some examples, as described herein, the communication platform can be permission-based such that users associated with individual channels, groups (e.g., workspaces, organizations), or the like have different permissions than users who are not associated with the individual channels, groups, or the like, thereby enabling different permissions for different users of the platform. In at least one example, snippets of content presented via the communication platform may be permissibly available to some users and not to others based at least in part on the permissions associated with such users. For instance, a snippet of content can be associated with a communication channel, such that users associated with the communication channel are permitted to view the snippet of content but users that are not associated with the communication channel are not permitted to view the snippet of content. In some examples, a snippet of content can be associated with a workspace of the communication platform such that users associated with workspace can view the snippet of content but users that are not associated with the workspace are not permitted to view the snippet of content. In some examples, a snippet of content can be associated with an organization associated with the communication platform such that users associated with organization can view the snippet of content but users that are not associated with the organization are not permitted to view the snippet of content. In some examples, individual snippets of content can be associated with permissions indicating which user(s), communication channel(s), workspace(s), organization(s), or the like are permitted to view, interact, or otherwise, access the snippet of content.

Techniques described herein enable the integration of snippets of content into a communication platform to enable users to create, access, and/or consume information when it is convenient for them to do so. By enabling users to access and consume snippets of content asynchronously, users can access and consume information when it is convenient for them to do so, enabling users to be more efficient and productive. Further, by enabling users to submit snippets of content for later consumption by other users, users can provide information when it is convenient for them to do so, again, enabling users to be more efficient and productive. As such, techniques described herein enable collaborative processes that are suited for asynchronous work to be done asynchronously (instead of synchronously, as with a video call or conference). Such techniques not only allow users to be more efficient and productive, but such techniques can provide an improved user experience for users of the communication platform described herein. Furthermore, by utilizing permissions, techniques described herein can restrict or permit access to snippets of content to ensure that users who are the intended audience of such snippets of content can access the snippets of content while other users, who are not part of the intended audience, are not able to access such snippets of content.

Additional details and examples are described below with reference to FIGS. 1-14. It should be noted that while reference is made herein to "snippets" of content, which can be short, quick portions of content that are consumable asynchronously, techniques described herein can be associated with any type of audio, image, and/or video content. That is, in some examples, the snippets of content described herein can be 5-10 seconds long, 30 seconds long, one minute long, 10 minutes long, shorter, longer, or some length between any of the lengths listed.

FIG. 1 illustrates an example environment 100 for performing techniques described herein. The example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces.

In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a channel management component 116, a content management component 118, an operating system 120, and a datastore 122.

In at least one example, the channel management component 116 can manage communication channels (i.e., "channels") of the communication platform. In at least one example, the communication platform can be "channel-based" such that the platform can be organized into communication channels having security (that can be defined by permissions) to limit access to defined groups of users (e.g., members of the communication channels). A communication channel, or virtual space, can be a data route used for exchanging data between and among systems and devices associated with the communication platform. In some examples, a communication channel may be "public," which may allow any user within a group (e.g., associated with an organization identifier, associated with a workspace identifier, etc.) with which the communication channel is associated to join and participate in the data sharing through the communication channel. In some examples, a communication channel may be "private," which may restrict data communications in the communication channel to certain users or users having particular roles (e.g., managers, administrators, etc.) and/or types (e.g., verified, etc.).

In some examples, a communication channel may be "shared," which may allow users associated with two or more different groups (e.g., entities associated with two or more different organization and/or workspace identifiers) to join and participate in the data sharing through the communication channel. A shared communication channel may be public such that it is accessible to any user of groups associated with the shared communication channel, or may be private such that it is restricted to access by certain users or users having particular roles and/or types. A "shared communication channel" or an "externally shared communication channel" can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared communication channel can be shared with one or more different workspaces and/or organizations that, without having a shared communication, would not otherwise have access to each other's data by the nature of the permission-based and/or group-based configuration of the communication platform described herein.

In at least one example, the channel management component 116 can receive a request to generate a communication channel. In some examples, the request can include a name that is to be associated with the communication channel, one or more users to invite to join the communication channel, and/or permissions associated with the communication channel. In at least one example, one or more user identifiers associated with one or more users and/or one or more user accounts can be mapped to, or otherwise associated with, a communication channel (e.g., a communication channel identifier associated therewith). User(s) associated with a communication channel can be "members" of the communication channel. Members of a communication channel can communicate with other members via the communication channel. That is, in at least one example, the channel management component 116 can establish a communication channel between and among various user computing devices associated with user identifiers associated with the communication channel, allowing the user computing devices to communicate and share data between and among each other. As described herein, in some examples, such communication and/or sharing of data can be via one or more messages that can be exchanged via a communication channel. In at least one example, the channel management component 116 can manage such communications and/or sharing of data. In some examples, data associated with a communication channel can be presented via a user interface.

As described above, in at least one example, one or more permissions can be mapped to, or otherwise associated with, a communication channel and/or members associated therewith. Such permission(s) can indicate which user(s) have permission to access the communication channel, actions and/or messages permitted in the communication channel, which user(s) and/or type(s) of users are permitted to add or remove members, which user(s) and/or types of users are permitted to share the communication channel with other users, a retention policy associated with data in the communication channel, whether the communication channel is public or private, or the like.

In some examples, a user interface associated with a communication channel can present data associated with communications related to the communication channel. As described above, at least some of the data that can be presented via a user interface associated with a communication channel can be a snippet of content, which can include audio content, haptic content, image content, and/or video content. In at least one example, the content management component 118 can facilitate the creation of, access to, and/or presentation of such snippets of content. Additional details are described below. In at least one example, the channel management component 116 can interact with the content management component 118 to manage the generation, presentation, and/or updating of user interface(s) associated with communication channels and/or the communication platform. Additional details of operations that can be performed by the channel management component 116 and/or the content management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one multiple databases, which can include user data 124, permission data 126, channel data 128, and content data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 can store snippets of content created by users of the communication platform. In such examples, individual snippets of content created by a user can be stored in a corresponding user profile and/or account.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on communication channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a communication channel can be mapped to, or otherwise associated with, data associated with the communication channel in the channel data 128. In some examples, permissions can indicate restrictions on individual communication channels, restrictions on user(s) associated with individual communication channels, and the like.

In at least one example, the channel data 128 can store data associated with individual communication channels. In at least one example, the channel management component 116 can establish a communication channel between and among various user computing devices, allowing the user computing devices to communicate and share data between and among each other. In at least one example, a communication channel identifier may be assigned to a communication channel, which indicates the physical address in the channel data 128 where data related to that communication channel is stored.

In at least one example, the content data can store data associated with snippets of content created by users of the communication platform. As described above, the snippets of content can include audio content, haptic content, image content, and/or video content. In at least one example, a content identifier may be assigned to a snippet of content, which indicates the physical address in the content data 130 where data related to that snippet of content is stored. In some examples, a snippet of content can be associated with an identifier of a user who created the snippet of content, user identifier(s) associated with other user(s) who can view or interact with the snippet of content, channel identifier(s) of communication channels with which the snippet of content is associated, group identifier(s) of group(s) with which the snippet of content is associated, and the like.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in some examples, in examples where the application 140 is described as performing an operation below, in an additional or alternative example, such an operation can be performed by another access point, such as a web browser or the like.

A non-limiting example of a user interface 144 is shown in FIG. 1. As illustrated in FIG. 1, the user interface 144 can present data associated with one or more communication channels and, in some examples, one or more groups. In some examples, the user interface 144 can include a first region 146, or pane, that includes indicator(s) (e.g., user interface element(s) or object(s)) representing data associated with the group(s), communication channel(s), etc. with which the user (e.g., account of the user) is associated. Additional details associated with the first region 146 and indicator(s) are described below with reference to FIG. 2.

In at least one example, the user interface 144 can include a second region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second region 148 can be associated with the same or different workspaces. That is, in some examples, the second region 148 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message and/or performed an action. In examples where the second region 148 presents data associated with multiple workspaces, at least some data can be associated with an indication of which workspace the data is associated with. Additional details associated with the user interface 144, and the second region 148, are described below with reference to FIG. 2.

In at least one example, one or more user interface elements 150 can be presented via the user interface 144, which can represent one or more snippets of content available to a user of the user computing device 104 (e.g., User F). In at least one example, a user interface element, as used herein, can be a text element, graphical element, image, symbol, or the like. In some examples, user interface elements can be selectable or otherwise interactable to provide an input to the user interface 144. In at least one example, the user can interact with a user interface element of the user interface element(s) 150 to view the snippet of content associated therewith. In at least one example, based at least in part on detecting a selection of one of the user interface element(s) 150, the application 140 can send an indication of the selection to the server(s) 102. The content management component 118 can access the snippet of content that corresponds to the selected user interface element (e.g., based at least in part on the associated content identifier) and can cause the snippet of content to be presented via the user interface 144. In some examples, the snippet of content can be presented via a pop-up, an overlay, a new user interface, the second region 148, and/or the like. In some examples, if multiple snippets of content are available to the user, each snippet of content can be presented automatically (e.g., without additional input from the user) and in a sequence in response to one of the snippets of content being selected for presentation and/or otherwise requested. In some examples, the sequence can be determined based at least in part on date, time (e.g., when associated data is posted or an associated operation is otherwise performed), type of action and/or data, workspace, communication channel, user, topic, relevance metric, and/or the like. In at least one example, the user can interact with the snippet of content to provide a reaction, comment (e.g., as a message), or the like.

In some examples, the user interface element(s) 150 presented can be associated with snippet(s) of content that have not yet been viewed by the user (e.g., are new since the most recent time the user accessed the communication channel or other virtual space). In other examples, the user interface element(s) 150 can be associated with new snippet(s) of content (i.e., snippet(s) of content that have not yet been viewed by the user) and/or previously viewed snippet(s) of content. In some examples, the user interface element(s) 150 can represent different user(s) associated with the communication channel and individual of the user interface element(s) 150 can be associated with an indicator when a new snippet of content is provided by the user to whom a user interface element corresponds. Additional details associated with presentation of the user interface elements 150, viewing associated snippet(s) of content, interacting with associated snippet(s) of content, and the like are described below.

In some examples, users associated with a communication channel and/or the communication platform can be associated with different permissions which can indicate whether a user can create, access, view, and/or interact with snippets of content. In some examples, permissions can be associated with individual snippets of content such that different snippets of content have different permissions. In some examples, permissions can be associated with individual user identifiers such that different users have different permissions. In some examples, permissions can be associated with group identifiers such that users of different workspaces have different permissions and/or users of different organizations have different permissions. In at least one example, if multiple organizations are associated with a communication channel (e.g., a shared communication channel), one or more first users may be able to access, view, and/or interact with snippets of content and one or more second may not be able to access, view, and/or interact with snippets of content based on permissions. In at least one example, the one or more first users may be associated with a first organization and the one or more second users may be associated with a second organization, which can have different permissions than the first organization. In some examples, the one or more first users may be associated with a selected group of user(s) having particular permissions and the one or more second users may not. In some examples, a user may only be permitted to view a snippet of content (i.e., not interact), for example, if a snippet of content is posted by an administrator or other user having a particular role. In some examples, a user may be permitted to view and interact with a snippet of content. In some examples, if a user is not permitted to access and/or view a snippet of content, a user interface element associated with the snippet of content may not be presented via the user interface 144. If a user is not permitted to access any snippets of content, the user interface element(s) 150 may not be presented via the user interface 144.

In at least one example, one of the user interface element(s) 150 can be associated with the user of the user computing device 104 (e.g., User F) and can include a user interface element 152 that, when actuated, enables the user to create a new snippet of content (e.g., record audio content, capture an image, capture a video, access previously recorded audio, access a previously captured image, access a previously captured video, or the like). Based at least in part on the user creating a new snippet of content, a new user interface element can be presented with the user interface element(s) 150 and/or the user interface element associated with the user can be associated with an indicator indicating that a new snippet of content has been provided by the user. In some examples, permissions can indicate whether a user can add their own snippets of content to a communication channel (or not). For instance, in some examples, particular users (e.g., administrators or other users with a designated role) can add snippets of content wherein other users may not be permitted to do so.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the channel management component 116, the content management component 118, and the application 140, techniques described herein can be performed by any other component, or combination of components, which can be associated with the server(s) 102, the user computing device 104, or a combination thereof.

Figure 2:
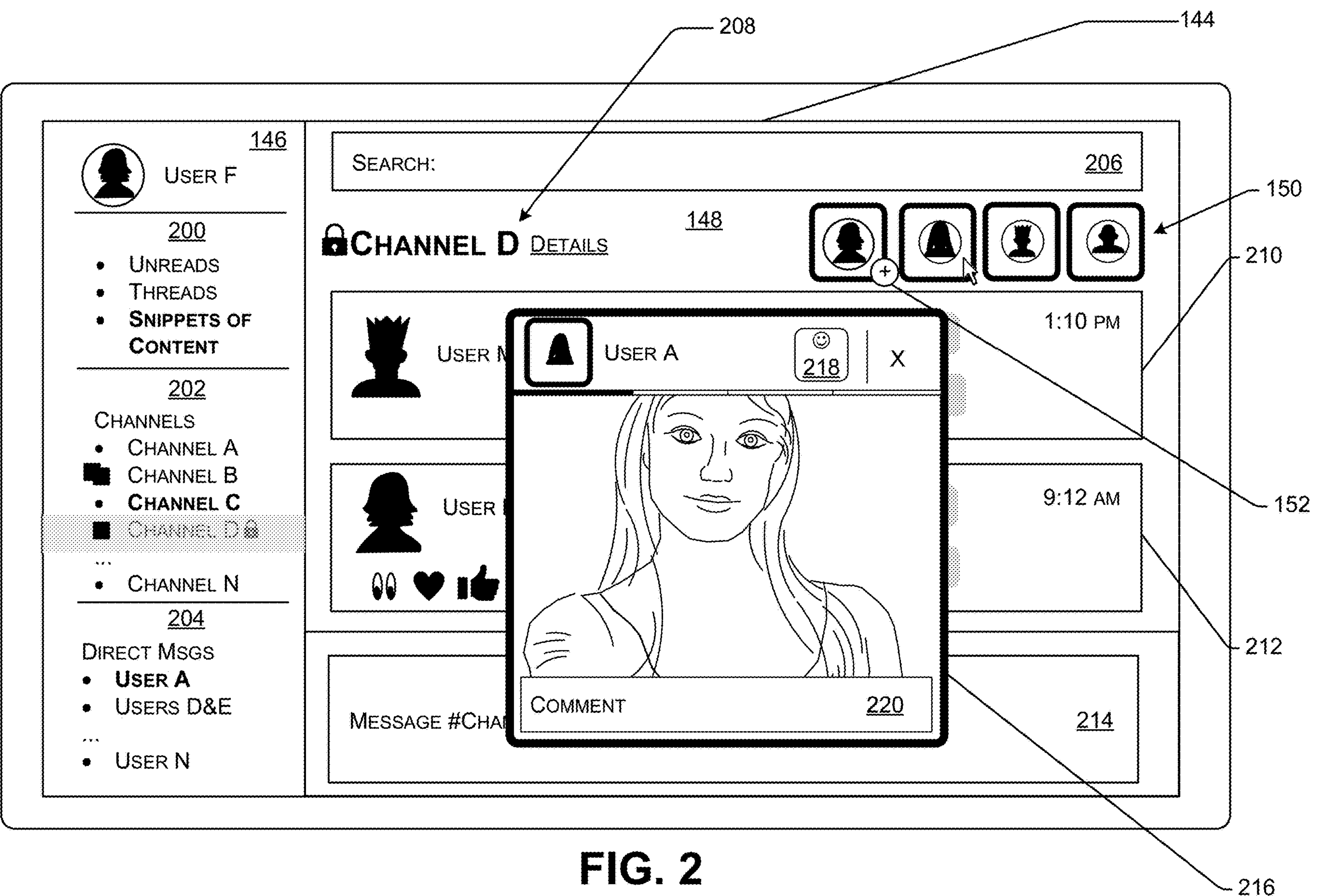
FIG. 2 illustrates additional details associated with the user interface described in FIG. 1, wherein the user interface is presenting user interface element(s) representative of snippet(s) of content, as described herein.

FIG. 2 illustrates additional details associated with the user interface 144. As described above, in some examples, the user interface 144 can include a first region 146, or pane, that includes indicator(s) (e.g., user interface element(s) or object(s)) representing virtual space(s) associated with the workspace(s) with which the user (e.g., account of the user) is associated. In at least one example, the first region 146 can include one or more sub-sections, or sub-panes, which can represent different virtual spaces. For example, a first sub-section 200 can include indicators representing virtual spaces that can aggregate data associated with a plurality of communication channels and/or workspaces. In at least one example, each virtual space can be associated with an indicator in the first sub-section 200. In some examples, an indicator can be associated with an actuation mechanism, that when actuated, can cause the application 140 to present data associated with the corresponding virtual space via the second region 148. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 148, for example in a feed. In another example, "threads" can be associated with messages, files, etc. posted in threads to messages posted in a communication channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. In some examples, if the user requests to access the virtual space associated with "snippets of content," snippets of content associated with the user, which can be associated with different communication channels and/or virtual spaces, can be presented via a same feed. In some examples, such data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message, performed an action, and/or provided the snippet of content. Additional details are described below.

In at least one example, the first region 146 of the user interface 144 can include a second sub-section 202, or sub-pane, that includes indicators representing communication channels. In some examples, the communication channels can include public channels, private channels, shared channels (e.g., between workspaces or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In some examples, the communication channels represented can be associated with combinations of communication channels associated with a single workspace and communication channels associated with different workspaces.

In some examples, the second sub-section 202 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 202 can depict all communication channels, or a subset of all communication channels, that the user is a member of, and the user can interact with the user interface 144 to browse or view other communication channels that the user is not a member of but are not currently displayed in the second sub-section 202. In some examples, different types of communication channels (e.g., public, private, shared, etc.) can be in different sections of the second sub-section 202, or can have their own sub-regions or sub-panes in the user interface 144. In some examples, communication channels associated with different workspaces can be in different sections of the second sub-section 202, or can have their own regions or panes in the user interface 144.

In some examples, the indicators can be associated with user interface elements that visually differentiate types of communication channels. For example, Channel B is associated with a double square user interface element instead of a circle user interface element. As a non-limiting example, and for the purpose of this discussion, the double square user interface element can indicate that the associated communication channel (e.g., Channel B) is an externally shared communication channel. In some examples, such a user interface element can be the same for all externally shared communication channels. In other examples, such a user interface element can be specific to the other group with which the externally shared communication channel is associated. In yet another example, a user interface element can be associated with a communication channel to indicate that the communication channel is associated with limited permissions. For example, the single square associated with Channel D can indicate that Channel D is associated with limited permissions. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 202 of the user interface 144. In such examples, the user may navigate to a different interface (not shown) to browse additional channels that are accessible to the user but to which the user is not currently a member.

In addition to the second sub-section 202, the first region 146 can include a third sub-section 204, or sub-pane, that can include indicators representative of communications with individual users or multiple specified users (e.g., instead of all, or a subset of, members of an organization). Such communications can be referred to as "direct messages." That is, the third sub-section 204, or sub-pane, can include indicators representative of virtual spaces that are associated with private messages between one or more users.

As described above, in at least one example, the user interface 144 can include a second region 148, or pane, that can be associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second region 148 can be associated with the same or different workspaces. That is, in some examples, the second region 148 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user posted the message and/or performed an action.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), application(s), etc.

A communication channel or other virtual space can be associated with data and/or content other than messages, or data and/or content that is associated with messages. For example, non-limiting examples of additional data that can be presented via the second region 148 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the second region 148 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.).

In at least one example, the user interface 144 can include a search mechanism 206, wherein a user can input a search term and the server(s) 102 can perform a search associated with the communication platform. In some examples, the search can be performed across each group with which the user is associated, or the search can be restricted to a particular group, based on a user specification.

In FIG. 2, the user can interact with the user interface element that corresponds to Channel D in the second sub-section 202 and as such, a feed associated with the communication channel can be presented via the second region 148 of the user interface. In some examples, the second region 148 can be associated with a header that includes user interface elements 208 representing information associated with Channel D. Furthermore, the second region 148 can include user interface elements 210 and 212 which each represent messages posted to the communication channel. As illustrated, the user interface elements 210 and 212 can include an indication of a user who posted the message, a time when the message was posted, content associated with the message, reactions associated with the message, and/or the like. In at least one example, the second region 148 can include an input mechanism 214, which can be associated with a message composition user interface to enable a user to compose a message to be posted to the communication channel.

As described above, in at least one example, one or more user interface elements 150 can be presented via the user interface 144. In at least one example, the one or more user interface elements 150 can represent one or more snippets of content available to a user of the user computing device 104 (e.g., User F). In at least one example, the user can interact with a user interface element of the user interface element(s) 150 to view the snippet of content associated therewith. In at least one example, based at least in part on detecting a selection of one of the user interface element(s) 150, the application 140 can send an indication of the selection to the server(s) 102. The content management component 118 can access the snippet of content that corresponds to the selected user interface element (e.g., based at least in part on the associated content identifier) and can cause the snippet of content to be presented via the user interface 144. In at least one example, as illustrated in FIG. 2, the snippet of content can be presented via a pop-up 216. In additional or alternative examples, the snippet of content can be presented via an overlay, new user interface, portion of the user interface 144, or the like.

In at least one example, the user can interact with the snippet of content to provide a reaction, comment (e.g., as a message), or the like. For example, as illustrated in FIG. 2, the user can interact with a selectable control 218 to provide a reaction. In some examples, based at least in part on detecting an actuation of the selectable control 218, the application 140 can cause a menu of emojis, reactjis, or the like to be presented via the user interface 144. The user can select one of the emojis, reactjis, or the like and the application 140 can send an indication of such to the server(s) 102. The content management component 118 can associate the selected reaction (e.g., emoji, reactji, or the like) with the snippet of content. In some examples, the selected reaction can be associated with the user interface element corresponding to the snippet of content. In some examples, the selected reaction can be associated with the snippet of content. In some examples, the selected reaction can be associated with a message created in a direct message communication between the user of the user computing device 104 and the user associated with the snippet of content. In some examples, the selected reaction may be ephemeral and disappear after being displayed for a predetermined period of time (e.g., a few seconds). Additional details are provided below.

In some examples, the user can provide an input to an input mechanism to enable the user to comment (e.g., as a message) on the snippet of content. In at least one example, the application 140 can send an indication of the comment to the server(s) 102. The content management component 118 can associate the comment with the snippet of content. In some examples, the comment can be associated with the user interface element corresponding to the snippet of content, which can be viewable by at least the user with which the snippet of content is associated. In some examples, the comment can be associated with a message created in a direct message communication between the user of the user computing device 104 and the user associated with the snippet of content. Additional details are provided below.

In some examples, the user interface element(s) 150 presented can be associated with snippet(s) of content that have not yet been viewed by the user (e.g., are new since the most recent time the user accessed the communication channel). In other examples, the user interface element(s) 150 can be associated with a combination of new snippet(s) of content (i.e., snippet(s) of content that have not yet been viewed by the user) and previously viewed snippet(s) of content. In some examples, the user interface element(s) 150 can represent different user(s) associated with the communication channel and individual of the user interface element(s) 150 can be associated with an indicator indicating that a new snippet of content is provided by the user to whom a user interface element corresponds. In some examples, the user interface element(s) 150 can be associated with previously viewed snippet(s) of content and/or may not be associated with a snippet of content at all. That is, in some examples, the user interface element(s) 150 can be presented whenever the user interface 144 is being presented but may not be associated with snippet(s) of content for viewing. In such examples, when a new snippet of content is added by a user, a corresponding user interface element can be associated with an indicator to indicate that a new snippet of content has been added.

In some examples, the user interface element(s) 150 can be ordered based at least in part on a date, a time, a topic, a relevance metric, and/or the like. A relevance metric can be determined based at least in part on a model that can compare a snippet of content and/or data associated therewith with the user, the communication channel, context data indicating a topic of discussion, or the like to determine a relevance metric between the snippet of content and/or data associated therewith and the user, the communication channel, context data indicating a topic of discussion, or the like. Such a relevance metric can be determined using similarity model(s) including, but not limited to, Euclidean distance, Cosine similarity, Pearson correlation, and/or the like.

As illustrated below, the user interface element(s) 150 can be presented in various locations within the user interface 144, in various configurations, with various shapes, and/or in various orders. That is, the locations, configurations, shapes, and/or orders illustrated herein are not limiting.

In at least one example, one of the user interface elements 150 can be associated with the user of the user computing device 104 (e.g., User F) and can include a user interface element 152 that, when actuated, enables the user to create a new snippet of content (e.g., record audio content, capture an image, capture a video, access previously recorded audio, access a previously captured image, access a previously captured video, or the like). Based at least in part on the user creating a new snippet of content, a new user interface element can be presented with the user interface element(s) 150 and/or the user interface element associated with the user can be associated with an indicator indicating that a new snippet of content has been provided by the user. The newly created snippet of content can be received by the content management component 118, which can associate the snippet of content with a content identifier and/or other data (e.g., the user identifier of the user that provided the snippet of content). The newly created snippet of content can be stored in the content data 130 and accessible by other users of the communication platform.

Figure 3:
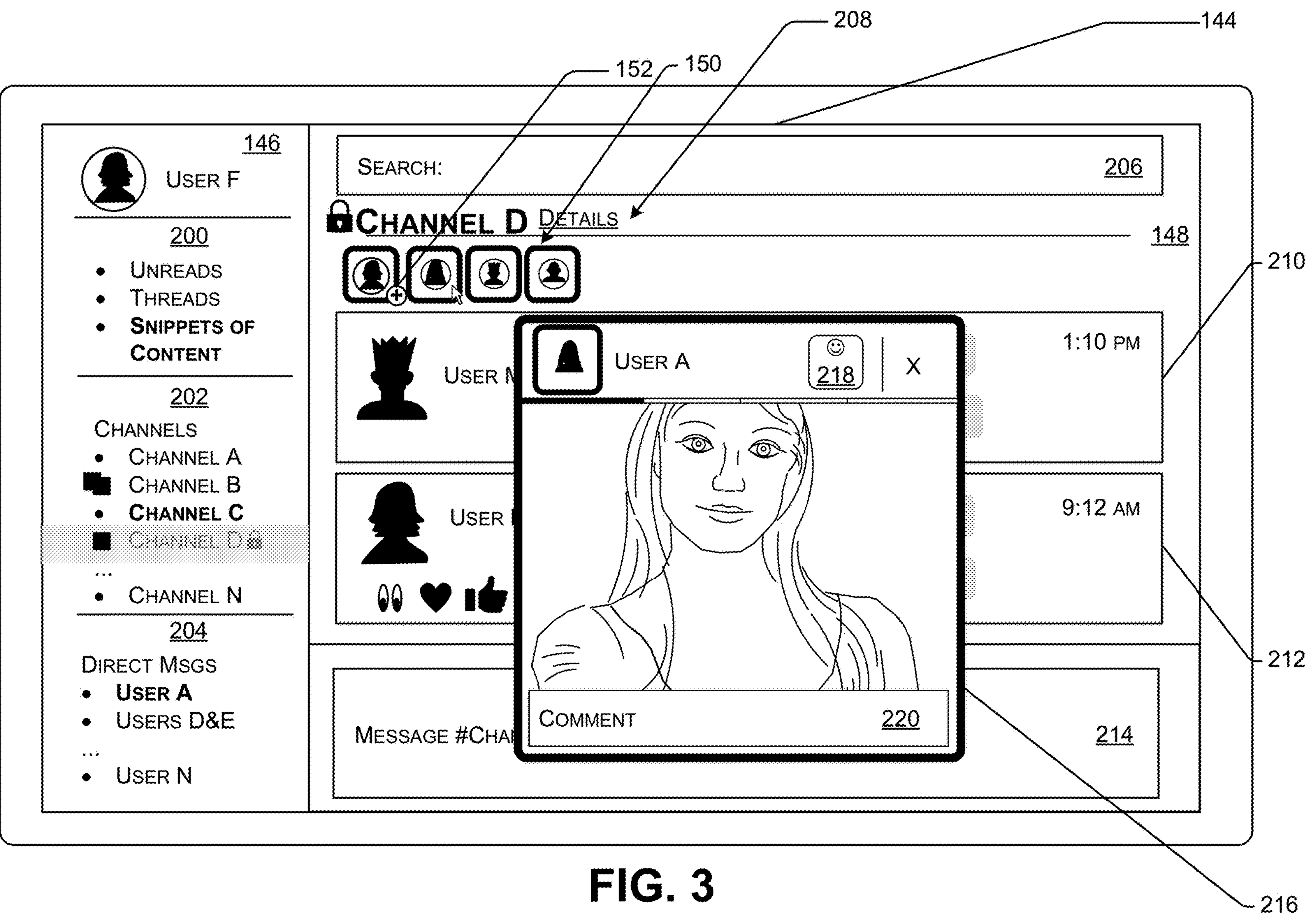
FIG. 3 illustrates another example of user interface element(s) presented via the user interface described in FIG. 1.
Figure 4:
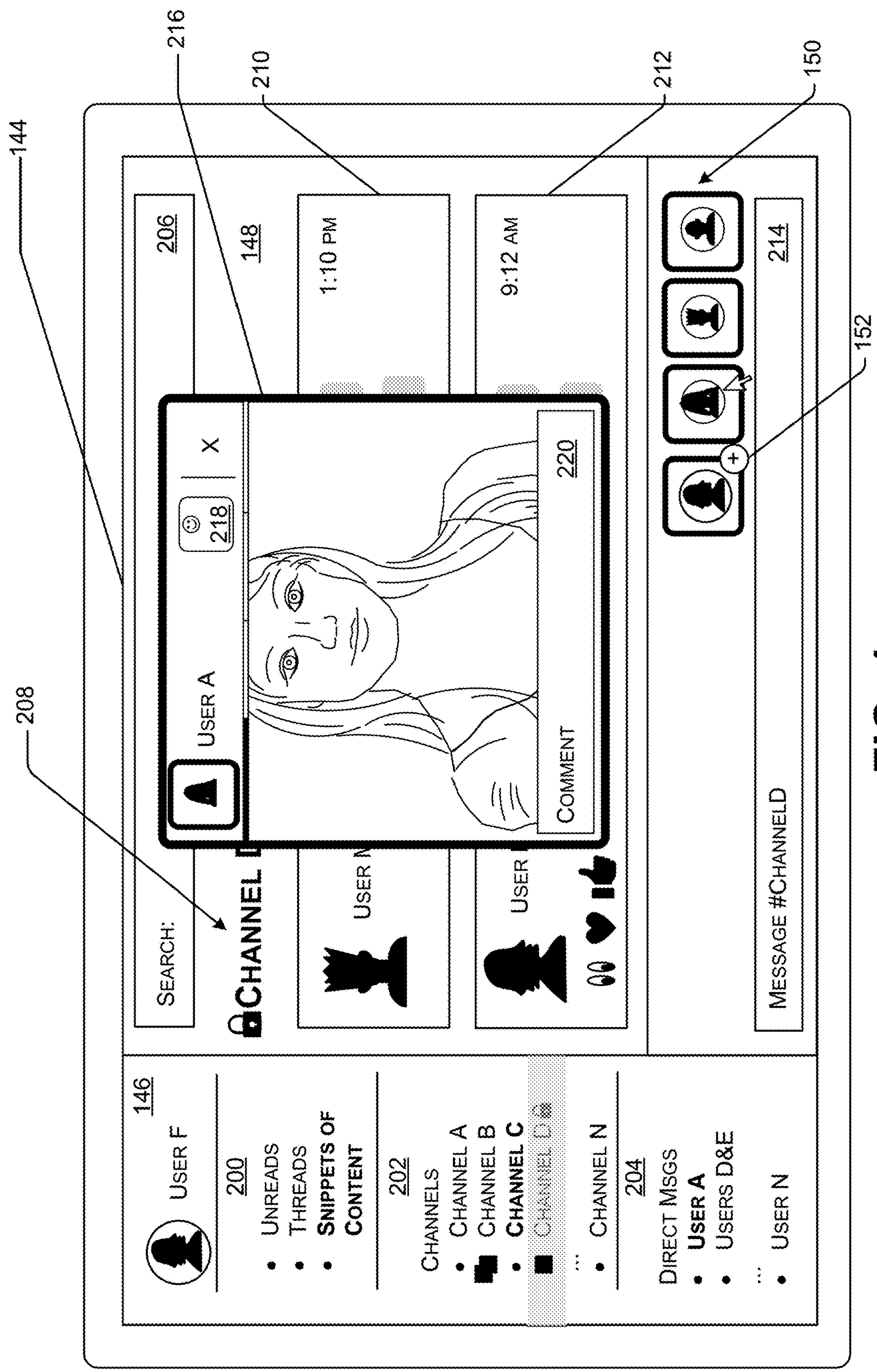
FIG. 4 illustrates another example of user interface element(s) presented via the user interface described in FIG. 1.
Figure 5A:
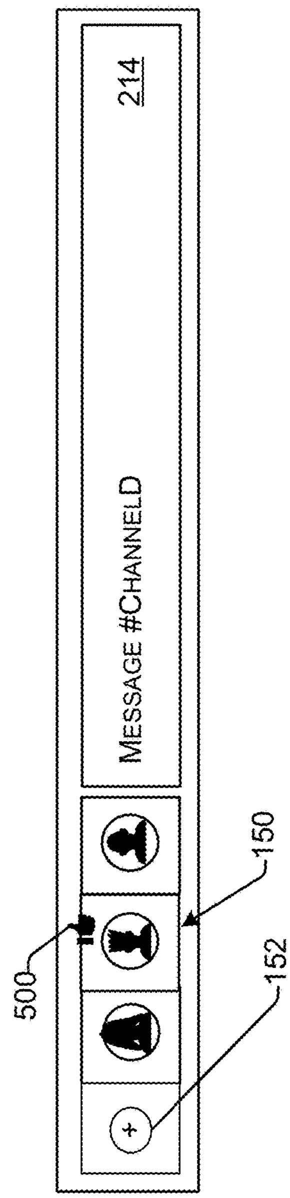
FIGS. 5A-5D illustrate example portions of the user interface described in FIG. 1, wherein the user interface element(s) are presented in different configurations.
Figure 5B:
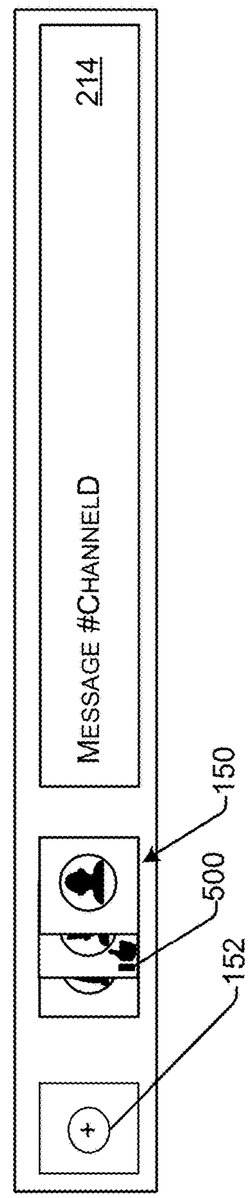
Figure 5C:
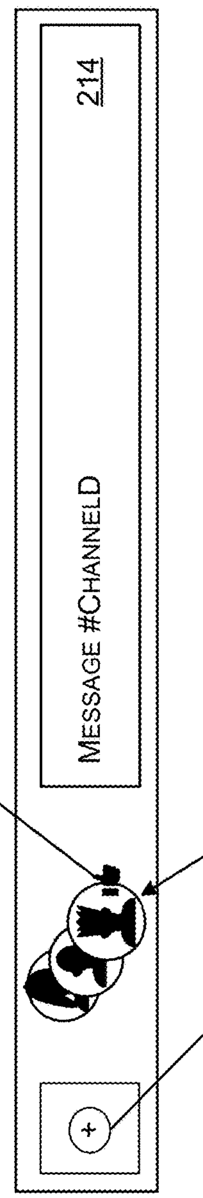
Figure 5D:
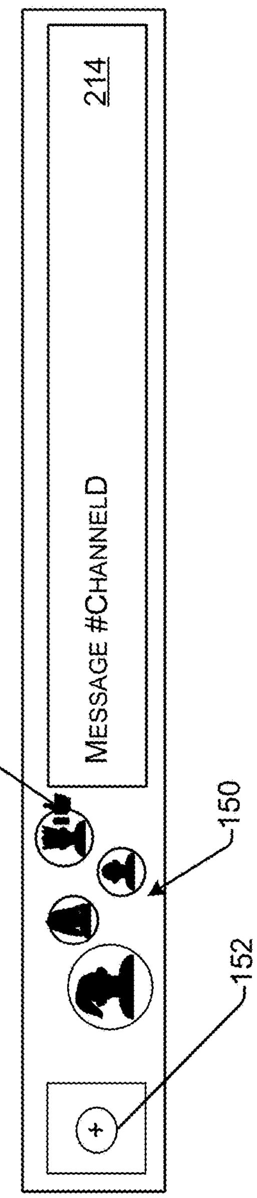

FIG. 2, above, illustrates an example of the user interface 144, wherein the user interface element(s) 150 can be presented via a header of the feed presented via the second region 148, or pane, of the user interface 144. FIGS. 3-6 illustrated additional or alternative locations within the user interface 144 that the user interface element(s) 150 can be presented. FIG. 3 illustrates an example of the user interface 144, wherein the user interface element(s) 150 can be presented via a subheader of the feed presented via the second region 148, or pane, of the user interface 144. That is, in FIG. 3, the user interface element(s) 150 can be presented in a subheader below the header with which the user interface element(s) 208 are associated. FIG. 4 illustrates an example of the user interface 144, wherein the user interface element(s) 150 can be presented proximate to an input mechanism 214 of the user interface 144 that is configured to receive a new message or new data to be associated with the communication channel.

FIGS. 5A-5D illustrate example portions of the user interface 144 associated with presenting user interface element(s) representative of snippet(s) of content, as described herein. As described above, the user interface element(s) 150 can be presented in various locations within the user interface 144, in various configurations, with various shapes, and/or in various orders. In some examples, the user interface element(s) 150 can be presented in a linear configuration (e.g., FIG. 5A), an overlapping configuration (e.g., FIG. 5B or FIG. 5C), a collage (e.g., FIG. 5A or FIG. 5D), and/or the like. In some examples, the user interface element(s) 150 can be presented in different shapes, sizes, or the like. The user interface element 152 can be presented in different places, with different graphics, or the like, as illustrated in FIGS. 5A-5D. Each of the examples shown in FIGS. 5A-5D are shown with the user interface element(s) 150 proximate to the input mechanism 214. However, the variations illustrated can be associated with any position or placement described herein, or otherwise within the scope of this disclosure. As described herein, in some examples, indications of reactions can be associated with the user interface element(s) 150. A non-limiting example of such an indication is represented by the user interface element 500 in FIGS. 5A-5D.

Figure 6:
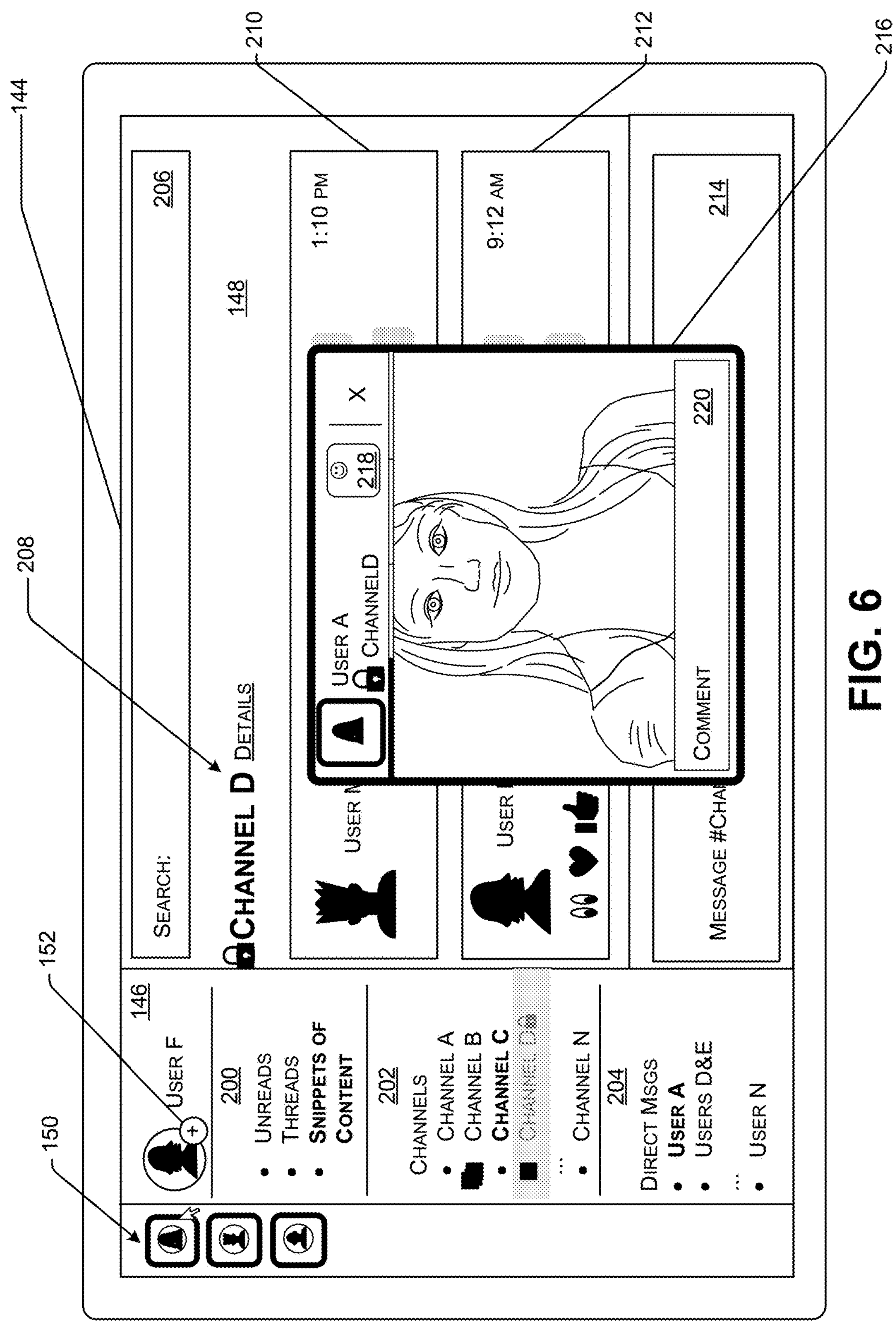
FIG. 6 illustrates another example of user interface element(s) presented via the user interface described in FIG. 1.

FIG. 6 illustrates yet another example user interface associated with presenting user interface element(s) representative of snippet(s) of content via a user interface, as described herein. As illustrated in FIG. 6, in some examples, the user interface element(s) 150 can be presented in association with a homepage or landing page of the communication platform instead of a particular communication channel. In such examples, the user interface element(s) 150 can represent snippets of content that the user (e.g., User F) is permitted to view within the workspace or across multiple workspaces, without regard to a particular communication channel, direct message communication, or the like. In some examples, and as shown in FIG. 6, the user interface element 152 can be associated with a feature of the user interface 144 such as a user interface element representative of the user or the like. In some examples, when the user interface element(s) 150 are presented generally (e.g., instead of in association with a particular communication channel, direct communication, or the like), additional details can accompany the snippet of content to provide relevant context. For instance, as illustrated in FIG. 6, the communication channel with which the snippet of content is associated is presented within the pop-up 216.

Figure 7:
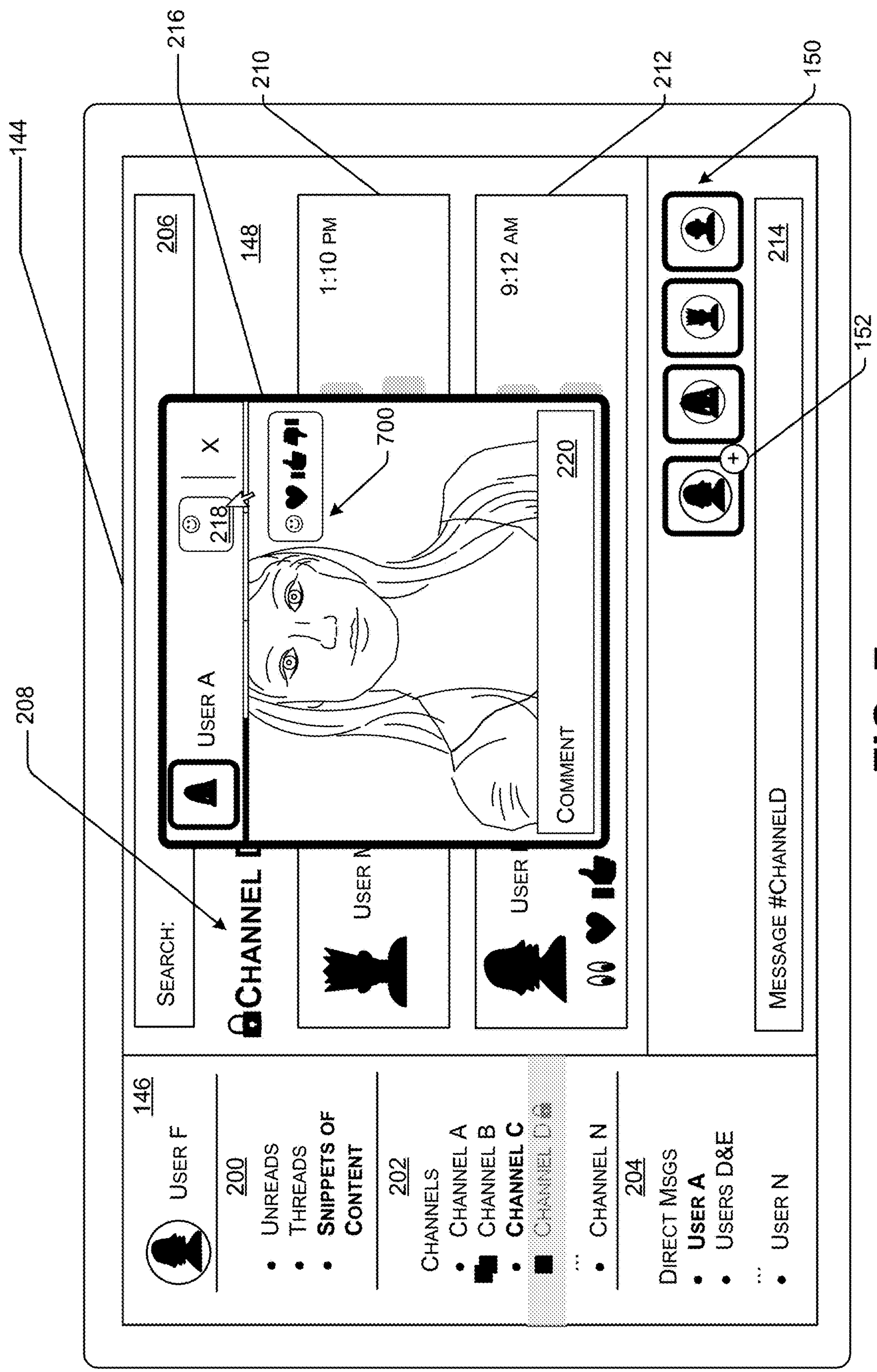
FIG. 7 illustrates an example wherein a user can interact with a snippet of content presented via the user interface described in FIG. 1 to provide a reaction thereto.

FIG. 7 illustrates an example wherein the user interface 144 is presenting a snippet of content, as described herein. In at least one example, based at least in part on a user selecting one of the user interface element(s) 150, the content management component 118 can cause a corresponding snippet of content to be presented via the user interface 144, as illustrated by the pop-up 216. In at least one example, the user can interact with a selectable control 218 which can cause a menu of reactions 700 (e.g., one or more reactions) to be presented for selection. In some examples, the reactions can be emojis, reactjis, or the like. In at least one example, based at least in part on detecting an input associated with one of the reactions, the application 140 can send an indication of such to the server(s) 102. The content management component 118 can associate the indication of the reaction with the snippet of content.

Figure 8:
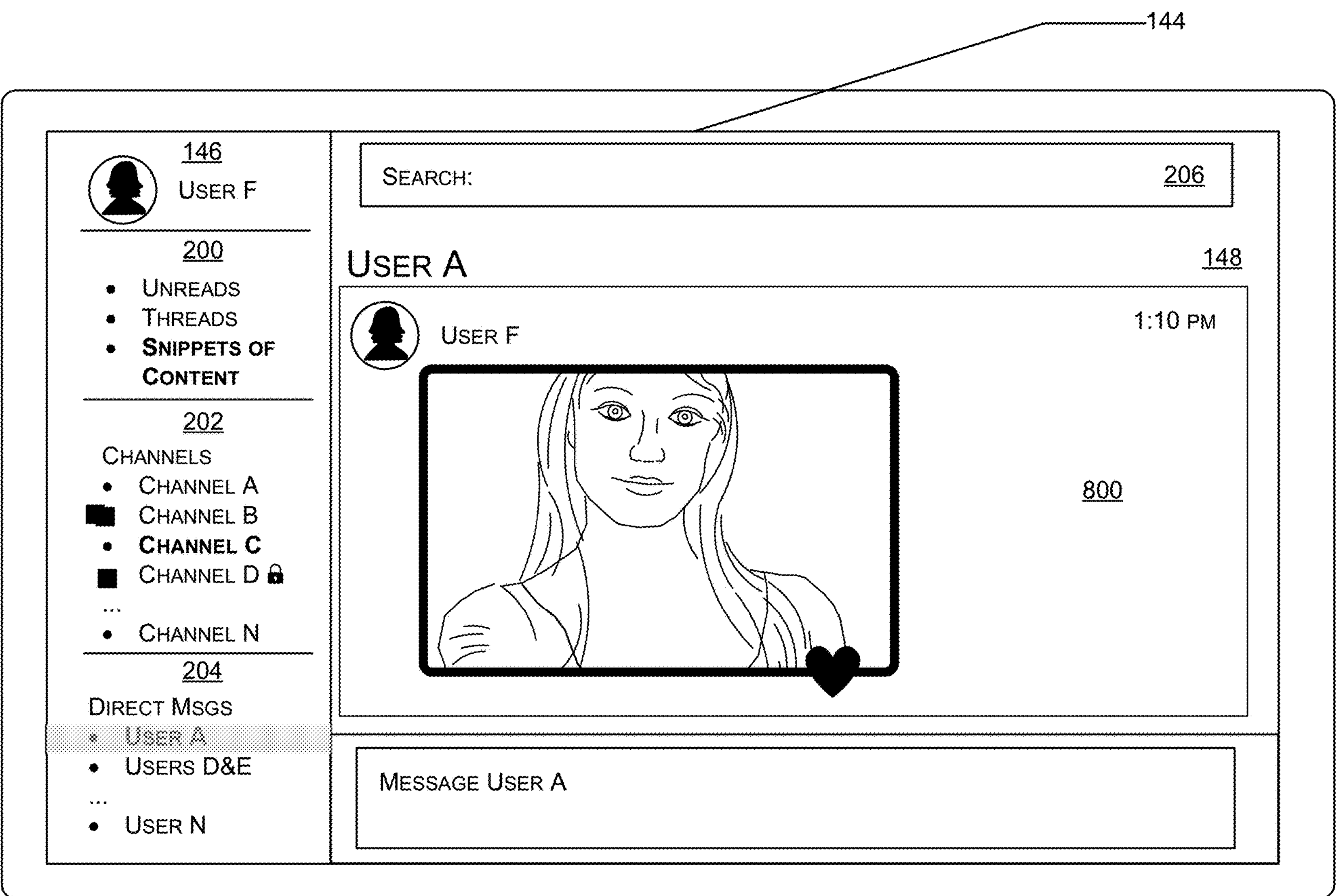
FIG. 8 illustrates an example wherein a reaction to a snippet of content is presented via the user interface described in FIG. 1 in a message associated with a direct message communication.

In some examples, the content management component 118 can generate a new message based at least in part on the indication of the reaction and can cause the new message to be associated with a direct message communication between the user that provided the snippet of content and the user that provided the reaction (e.g., the user of the user computing device 104). FIG. 8 illustrates an example wherein the user interface 144 is associated with a feed associated with a direct message communication between User A and User F. As illustrated, a representation of the snippet of content and the reaction can be presented in association with a message 800 via the user interface 144. In an alternative example, such a message can be posted to a communication channel with which the snippet of content and/or user(s) are associated, such that members of the communication channel can view and/or otherwise interact with the message.

Figure 9:
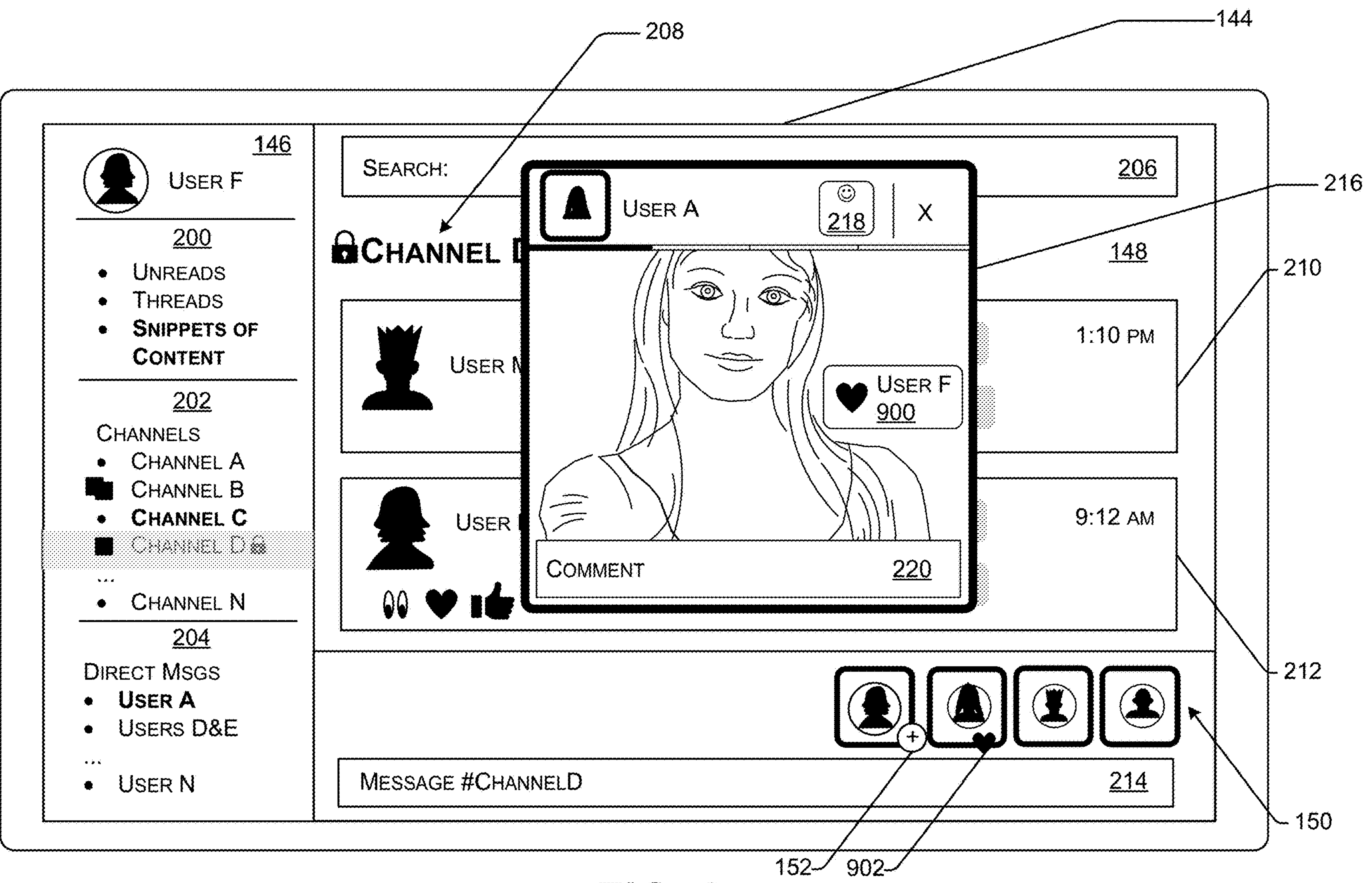
FIG. 9 illustrates an example wherein a reaction to a snippet of content is presented in association with the snippet of content.

In some examples, the content management component 118 can associate an indication of the reaction with the snippet of content in real-time or near real-time. FIG. 9 illustrates another example wherein the snippet of content is being presented via the user interface 144 and the indication of the reaction 900 can be presented in association with the snippet of content. In some examples, the indication of the reaction 900 can be ephemeral and can be presented for a predetermined period of time before disappearing from the snippet of content. In some examples, the indication of the reaction 900 can be presented in association with the snippet of content for as long as the snippet of content is available. In some examples, an additional or alternative indication of the reaction, as shown by user interface element 902, can be associated with a user interface element representative of the snippet of content.

Figure 10:
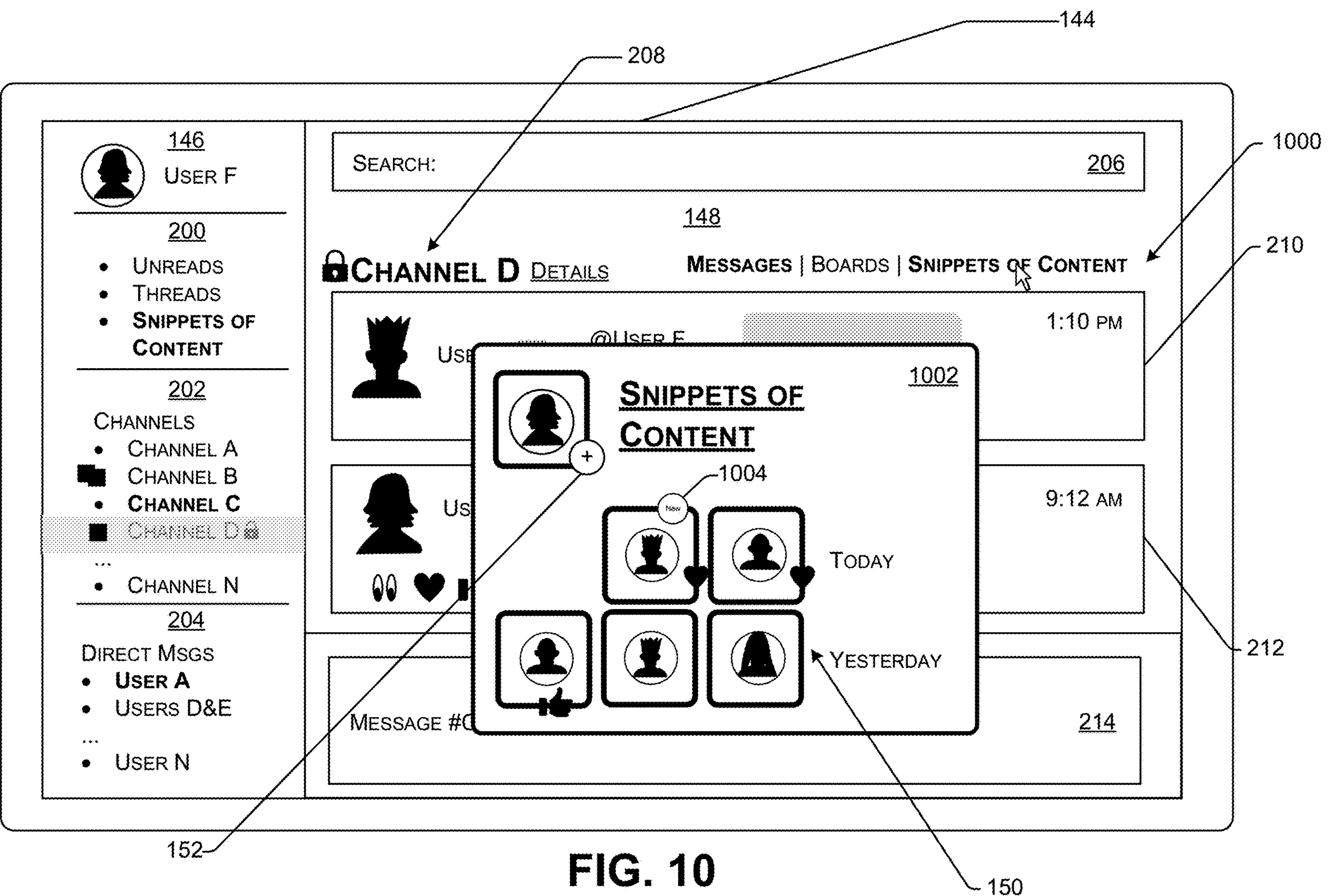
FIG. 10 illustrates an example wherein the user interface described in FIG. 1 presents a plurality of snippet(s) of content, as described herein.

FIG. 10 illustrates an example, wherein the user interface element(s) 150 are configured in an aggregated presentation on the user interface 144. In some examples, the user can select a user interface element from a plurality of user interface elements 1000 that enable navigation between different types of data (e.g., messages, boards (e.g., a virtual space, that can be associated with a communication channel, that can include different types of data, workflows, action items, and/or the like), snippets of content) associated with the communication channel. In at least one example, based at least in part on detecting a selection of one of the user interface elements 1000 that corresponds to snippets of content, the application 140 can send an indication of the selection to the content management component 118. The content management component 118 can cause the user interface element(s) 150, which can represent snippet(s) of content associated with the communication channel, to be presented via the user interface 144. In at least one example, as illustrated in FIG. 10, the user interface element(s) 150 can be presented in a pop-up 1002. In an additional or alternative example, the user interface element(s) 150 can be presented via an overlay, a new user interface, or can replace the message feed shown in the second region 148 of the user interface 144. In some examples, the user interface element (s) 150 can represent all new snippet(s) of content (e.g., that have not yet been viewed by the user) associated with a communication channel. As illustrated in FIG. 10, in some examples, the user interface element(s) 150 can be arranged by date. However, in additional or alternative examples, the user interface element(s) 150 can be arranged based at least in part on time, user, a relevance metric, and/or the like. In some examples, the user interface element(s) 150 can represent previously viewed snippets of content and/or new snippets of content associated with the communication channel. In such an example, user interface element(s) associated with new snippet(s) of content can be associated with an indicator 1004 indicating that the associated snippet(s) of content have not been viewed (i.e., that a new snippet of content is available).

Figure 11:
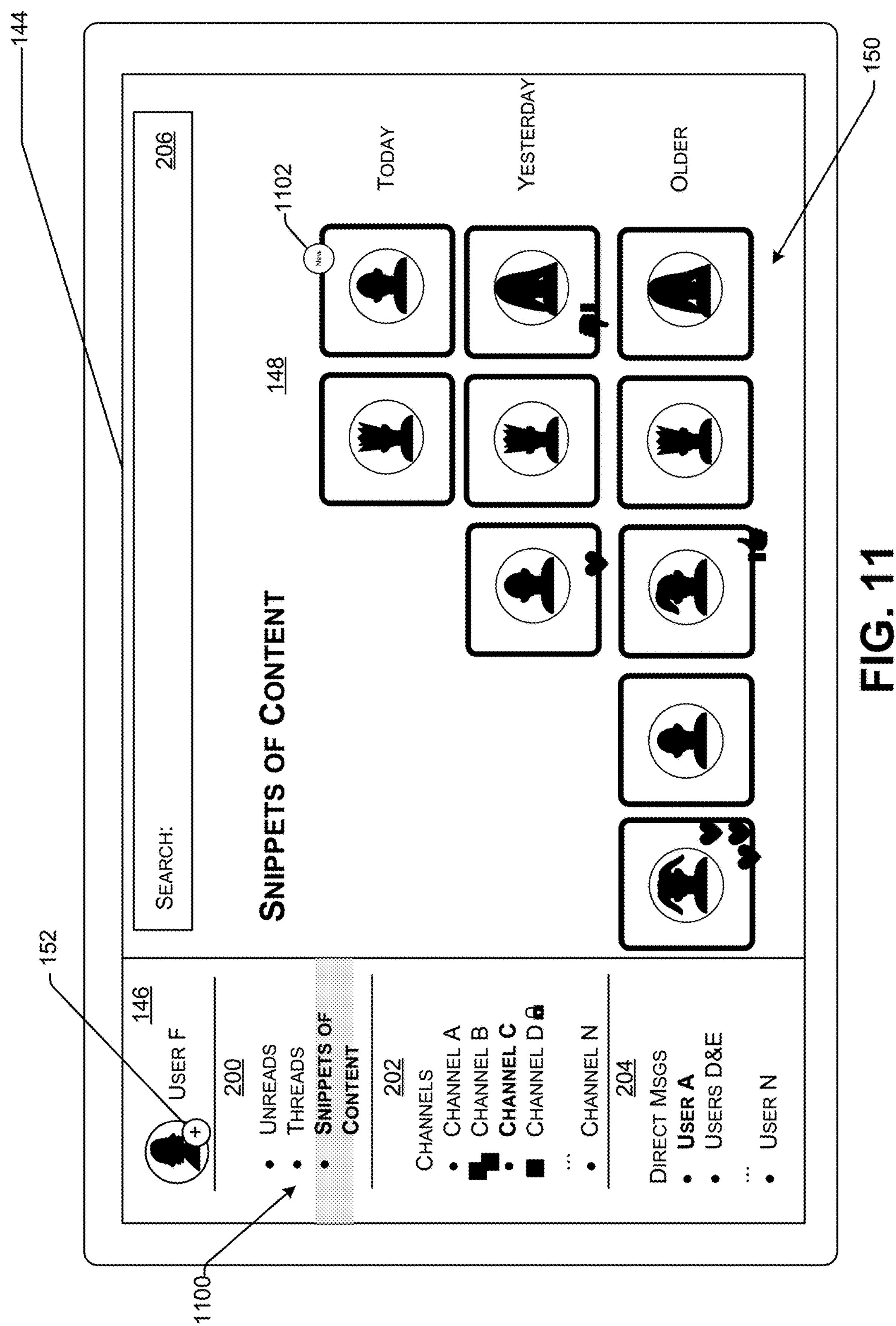
FIG. 11 illustrates an example wherein the user interface described above in FIG. 1 presents a plurality of snippet(s) of content, as described herein.

In at least one example, and as illustrated in FIG. 11, the user can interact with one of the user interface elements 1100 associated with the first sub-section 200 of the first region 146 to access an aggregated presentation of the user interface element(s) 150. In such an example, the user interface element(s) 150 can represent snippet(s) of content from different communication channel(s), workspace(s), organization(s), or the like. In at least one example, based at least in part on detecting an interaction with the user interface element of the user interface elements 1100, the application 140 can send an indication of the interaction to the server(s) 102. The content management component 118 can determine one or more snippets of content to be availed to the user. In some examples, the content management component 118 can cause one or more user interface elements that are representative of the one or more snippets to be availed to the user and can use the one or more user interface elements 150 to be presented via the second region 148 of the user interface 144. In some examples, the user interface element(s) 150 can represent all new snippet(s) of content (e.g., that have not yet been viewed by the user). As illustrated in FIG. 11, in some examples, the user interface element(s) 150 can be arranged by date. However, in additional or alternative examples, the user interface element(s) 150 can be arranged based at least in part on time, user, communication channel, workspace, organization, a relevance metric, and/or the like. In some examples, the user interface element(s) 150 can represent previously viewed snippets of content and/or new snippets of content. In such an example, user interface element(s) associated with new snippet(s) of content can be associated with an indicator 1102 indicating that the associated snippet(s) of content have not been viewed.

In some examples, the snippets of content are searchable and returned in the search results along with any messages that are relevant matches to the search query. In some examples, the snippets of content are returned in a snippets of content only section that does not include other non-snippet-type search results (e.g., messages, audio recordings, files).

Figure 12:
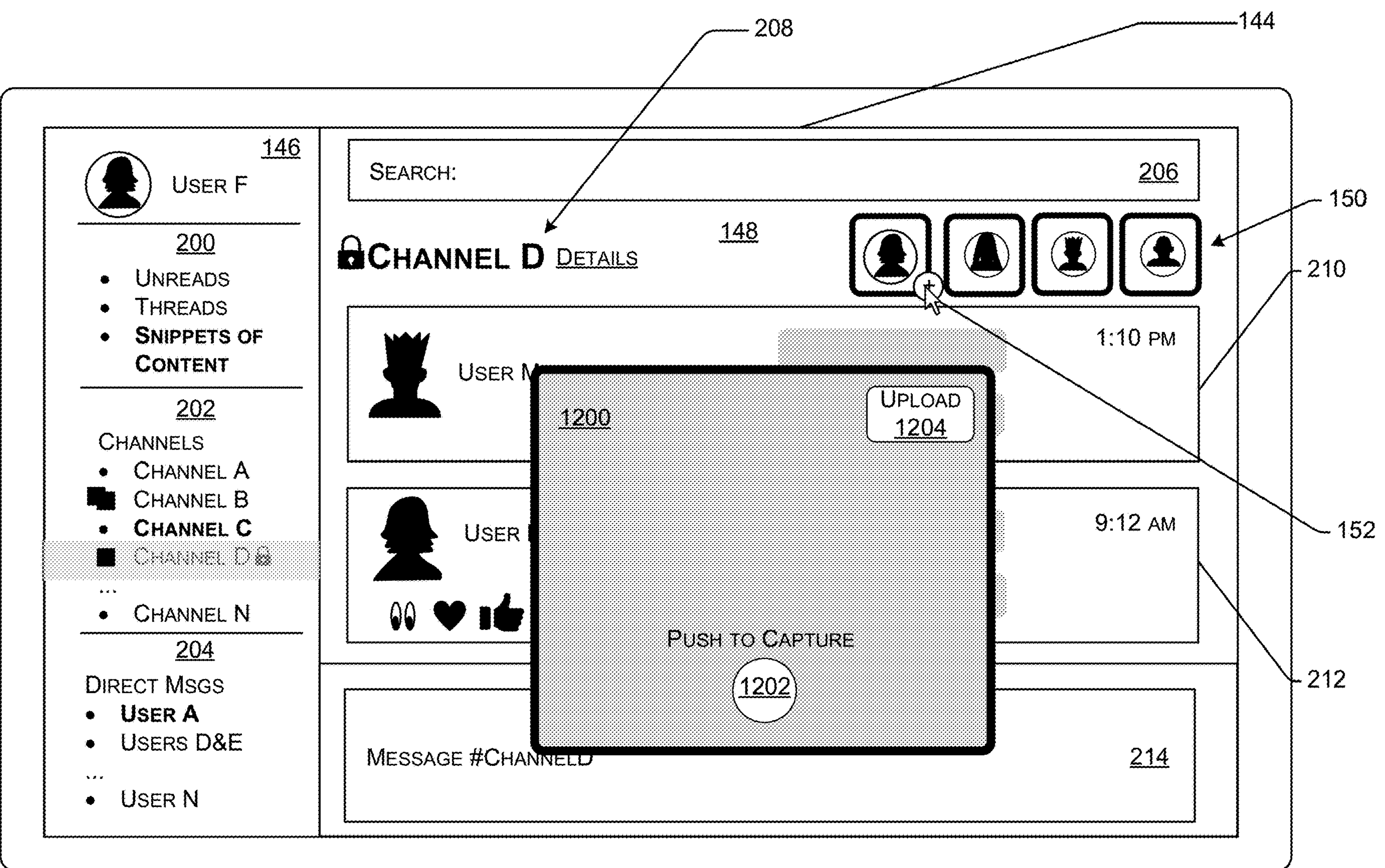
FIG. 12 illustrates an example wherein a capturing mechanism is presented via the user interface described in FIG. 1 to enable a user to capture a new snippet of content.

FIG. 12 illustrates an example wherein a capturing mechanism 1200 is presented via the user interface 144. In at least one example, based at least in part on detecting an interaction with the user interface element 152, the application 140 can cause a capturing mechanism 1200 to be presented via the user interface 144. In some examples, the capturing mechanism 1200 can be an audio recorder, a camera, and/or the like. In at least one example, the capturing mechanism 1200 can be native to the application 140. In other examples, the capturing mechanism 1200 can be associated with the user computing device 104 and can be configured to be accessible by the application 140 and/or provide content thereto. In at least one example, the user can actuate a selectable control 1202 to start capturing content and, in some examples, stop capturing content. In at least one example, the user can actuate a selectable control 1204 to upload the content to the server(s) 102. Based at least in part on detecting actuation of the selectable control 1204, the captured content can be sent from the application 140 to the content management component 118. The content management component 118 can receive the content, associate a content identifier therewith, and store the content (e.g., as a snippet of content) in the datastore 122. The content management component 118 can then cause a user interface element to be presented via the user interface 144 indicating that a new snippet of content is available for viewing. In some examples, if a user interface element for the user is already associated with the user interface 144, the content management component 118 can cause an indicator to be associated with the user interface element to indicate that a new snippet of content is available.

In some examples, a new snippet of content can be generated based on previously captured audio content, haptic content, image content, and/or video content. In such examples, the application 140 can access a datastore of content on the user computing device 104 and/or a datastore to which the user computing device 104 has access and can enable the user to select audio content, haptic content, image content, and/or video content from the stored data for association with a new snippet of content. The content management component 118 can receive the content, associate a content identifier therewith, and store the content (e.g., as a snippet of content) in the datastore 122. The content management component 118 can then cause a user interface element to be presented via the user interface 144 indicating that a new snippet of content is available for viewing. In some examples, if a user interface element for the user is already associated with the user interface 144, the content management component 118 can cause an indicator to be associated with the user interface element to indicate that a new snippet of content is available.

Figure 13:
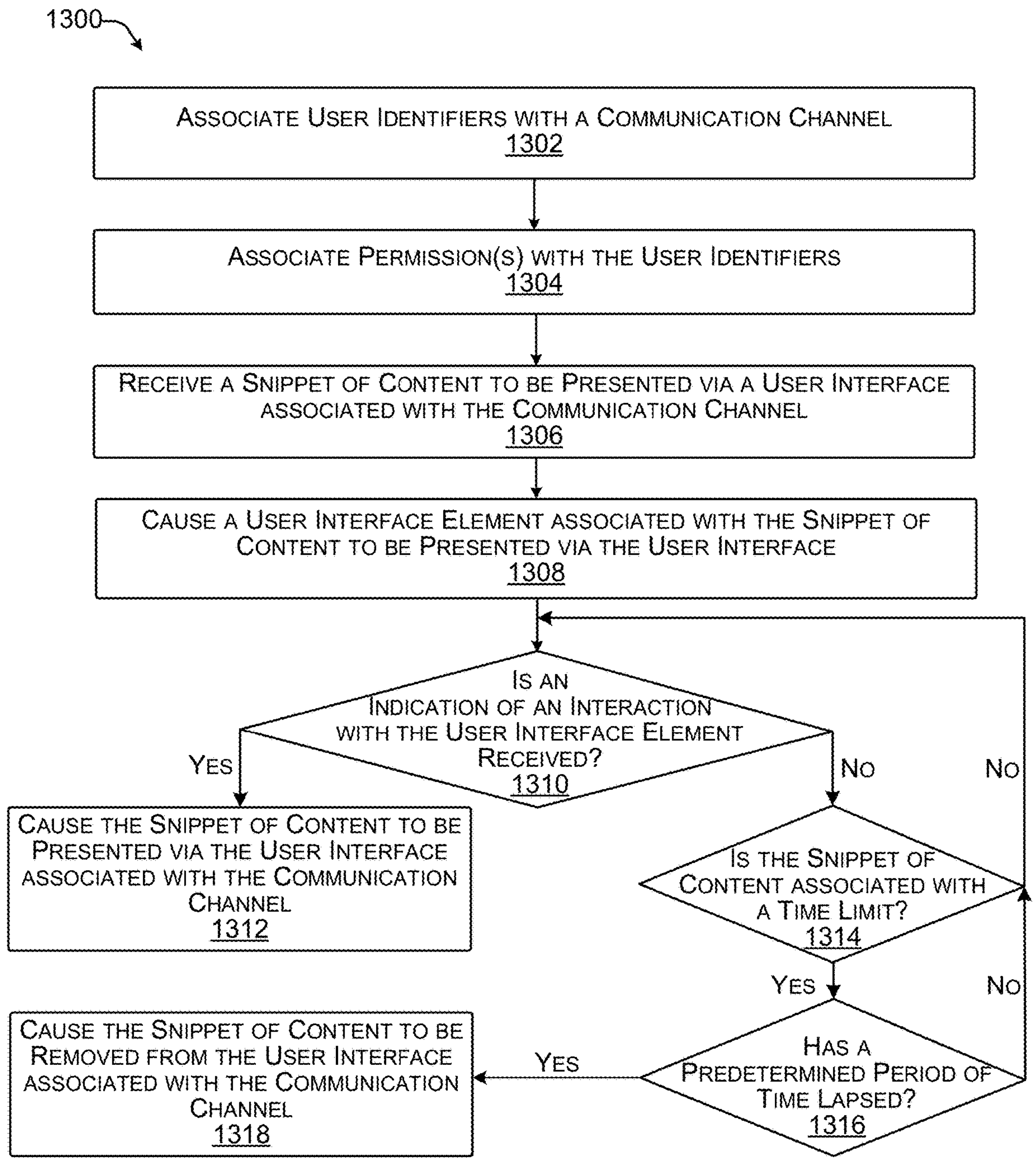
FIG. 13 illustrates an example process for presenting a snippet of content via a user interface of a communication platform, as described herein.
Figure 14:
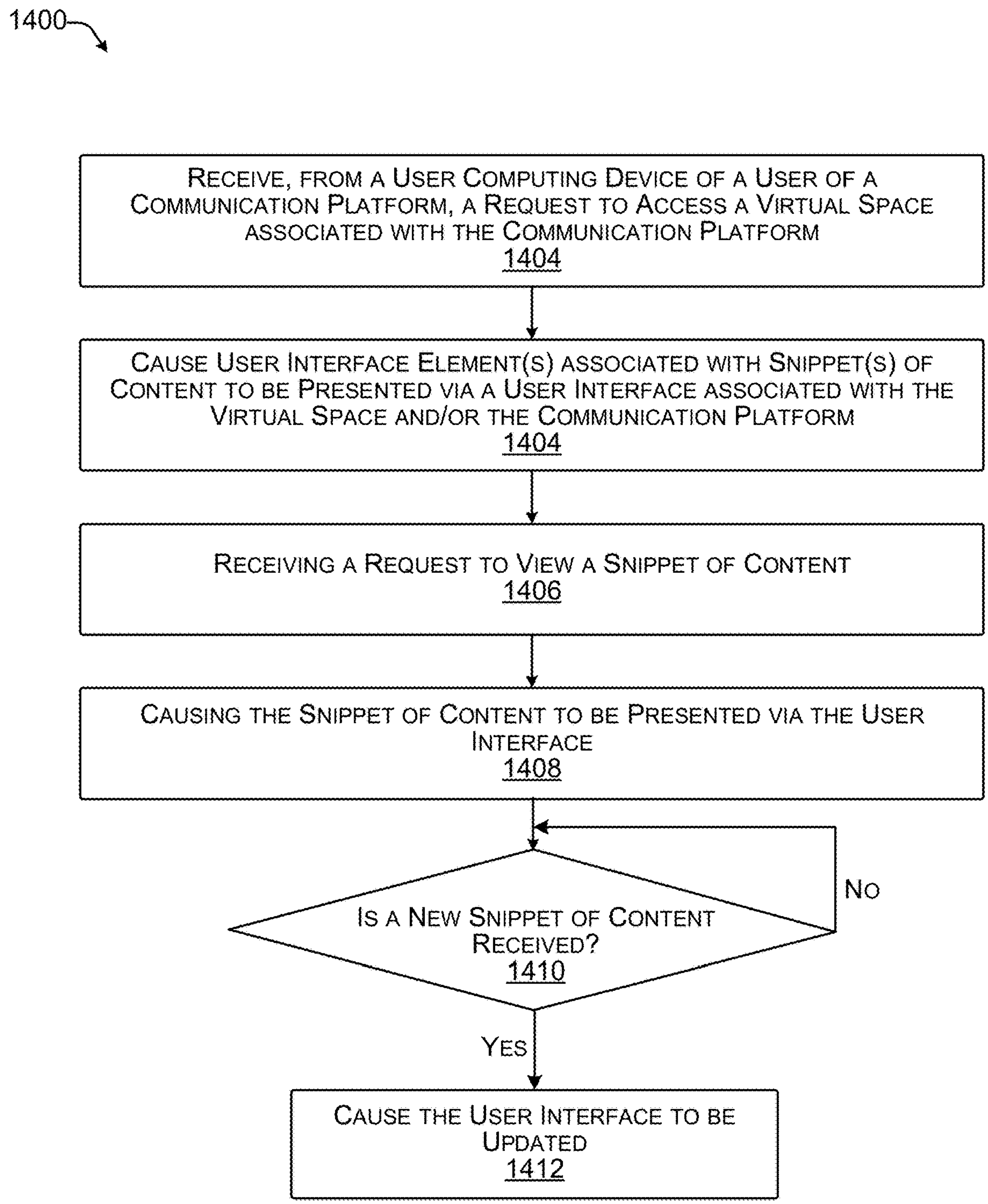
FIG. 14 illustrates another example process for presenting snippet(s) of content via a user interface of a communication platform, as described herein.

FIGS. 13 and 14 are flowcharts showing example processes involving techniques as described herein. The processes illustrated in FIGS. 13 and 14 are described with reference to components described above with reference to the environment 100 shown in FIG. 1 for convenience and ease of understanding. However, the processes illustrated in FIGS. 13 and 14 are not limited to being performed using the components described above with reference to the environment 100. Moreover, the components described above with reference to the environment 100 are not limited to performing the processes illustrated in FIGS. 13 and 14.

The processes in FIGS. 13 and 14 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 13 and 14 can be combined in whole or in part with each other or with other processes.

As noted above, the processes illustrated in FIGS. 13 and 14 are described with reference to components described above with reference to the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104. FIGS. 13 and 14 describe interactions between two or more user computing devices, each which can be configured similarly to the user computing device 104, and/or the server(s) 102.

FIG. 13 illustrates an example process 1300 for presenting a snippet of content via a user interface of a communication platform, as described herein.

Block 1302 illustrates associating user identifiers with a communication channel. As described above, in at least one example, the communication platform can be "channel-based" such that the platform can be organized into communication channels having security (that can be defined by permissions) to limit access to defined groups of users (e.g., members of the communication channels). In at least one example, the channel management component 116 can establish a communication channel between and among various user computing devices, allowing the user computing devices to communicate and share data between and among each other. In at least one example, the channel management component 116 can manage such communications and/or sharing of data. In at least one example, the channel management component 116 can associate user identifiers with the communication channel. In some examples, the channel management component 116 can do so based on receiving a request from a user of the communication platform, and to define which users can communicate and share data between and among each other using the communication channel. Users associated with such user identifiers can be "members" of the communication channel. In at least one example, the communication channel can be associated with permissions that can control how the members of the communication channel can interact with the communication channel and/or data associated therewith.

Block 1304 illustrates associating permission(s) with the user identifiers. In at least one example, the communication channel can be associated with permission(s) that can control how the members of the communication channel can interact with the communication channel and/or data associated therewith. In at least one example, the channel management component 116 can associate the communication channel permission(s) with each of the user identifiers associated with the communication channel. In some examples, users associated with the user identifiers can be associated with additional or alternative permissions, which can be designated by an organization, workspace, other communication channels, other users, and/or the like. In some examples, permission(s) can indicate whether a user can access, create, and/or view a snippet of content. In some examples, such permission(s) can be based on membership within the communication channel (e.g., only members of a communication channel can access, create, and/or view snippets of content, only a subset of members in a communication channel can access, create, and/or view snippets of content, etc.). In some examples, the permission(s) can indicate whether a user can access, view, and/or interact with a snippet of content. In some examples, a user may only be permitted to view a snippet of content (i.e., not interact), for example, if a snippet of content is posted by an administrator or other user having a particular role. In some examples, a user may be permitted to view and interact with a snippet of content. In some examples, the permission(s) can indicate whether a user can add their own snippets of content to the communication channel (or not). For instance, in some examples, particular users (e.g., administrators or other users with a designated role) can add snippets of content wherein other users may not be permitted to do so.

Block 1306 illustrates receiving a snippet of content to be presented via a user interface associated with the communication channel. In at least one example, the content management component 118 can receive a snippet of content. As described above, the snippet of content can be audio content, haptic content, image content, video content, and/or the like. In some examples, the snippet of content can be received from a capturing mechanism (e.g., via the application 140). In some examples, the snippet of content can be a previously captured snippet. In at least one example, the content management component 118 can associate a content identifier with the snippet of content and, in some examples, additional or alternative data with the snippet of content. Such additional or alternative data can indicate a user identifier of the user who provided the snippet of content, a communication channel identifier, a workspace identifier, an organization identifier, a topic, a datestamp when the snippet of content was received, a timestamp when the snippet of content was received, or the like. Such data can be associated with the snippet of content and can be stored in the datastore 122 (e.g., in the content data 130).

Block 1308 illustrates causing a user interface element associated with the snippet of content to be presented via the user interface. In at least one example, the content management component 118 can cause a user interface element associated with the snippet of content to be presented via the user interface. In some examples, the user interface element can be a text element, graphical element, image, symbol, etc. associated with the user who provided the snippet of content. In some examples, the user interface element can be a representative image from the snippet of content. In some examples, if a user interface element associated with the user that provided the snippet of content is already being presented via the user interface, an indicator can be associated with the user interface element to indicate that a new snippet of content is available. In some examples, the user interface may not change for a viewer, but the new snippet of content can be availed via the user interface based at least in part on a detected interaction between a user and a corresponding user interface element. Various examples of user interface elements and presentations of such via the user interface are described above.

Block 1310 illustrates determining whether an indication of an interaction with the user interface element is received. As described above, the application 140 can detect an interaction with a user interface element and can send an indication of such an interaction to the server(s) 102. Based at least in part on receiving an indication of an interaction with the user interface element (e.g., via the application 140 and from the user computing device 104), the content management component 118 can cause the snippet of content to be presented via the user interface associated with the communication channel, as illustrated at block 1312. As described above, the snippet of content can be presented as a pop-up, an overlay, a new user interface, or the like. In some examples, the snippet of content can be associated with one or more mechanisms and/or selectable controls to enable viewers to interact with the snippet of content (e.g., provide a reaction, comment, or the like).

Block 1314 illustrates determining whether the snippet of content is associated with a time limit. As described above, in some examples, snippets of content may only be available for a predetermined period of time (e.g., they may be ephemeral). In such an example, the content management component 118 can determine whether a snippet of content that has not been viewed (e.g., an indication of an interaction with the user interface element has not been received) is associated with a time limit for which it is available, and, if the snippet of content is associated with a time limit (i.e., "yes" at block 1314), the content management component 118 can determine whether a predetermined period of time associated with the time limit has lapsed, as illustrated at block 1316. If the predetermined period of time has lapsed (i.e., "yes" at block 1316), the content management component 118 can cause the snippet of content to be removed from the user interface associated with the communication channel, as illustrated at block 1318. That is, the snippet of content may no longer be available for viewing by users of the communication channel. In some examples, a user interface element representative of the snippet of content can be removed. In other examples, an indicator indicating that a snippet of content is available for viewing can be removed. In some examples, the user interface 144 itself may not change but the snippet of content may not be accessible to users of the communication channel.

If the snippet of content is not associated with a time limit (i.e., "no" at block 1314), the process can return to block 1310. Similarly, if the snippet of content is associated with a time limit (i.e., "yes" at block 1314), but the predetermined period of time associated with the time limit has not lapsed (i.e., "no" at block 1316), the process can return to block 1310.

While FIG. 13 is described with reference to a communication channel, the same or similar operations can be performed in association with a direct message communication. That is, in some examples, two or more users associated with a direct message communication can create snippets of content that can be presented via the user interface 144 in association with the direct message communication. In some examples, if a user doesn't have permissions to access and/or view snippet(s) of content (e.g., the user, an associated group, and/or an associated organization doesn't have permissions to access and/or view snippet(s) of content), the user interface element(s) 150 may not be presented via the user interface 144.

FIG. 14 illustrates an example process 1400 for presenting snippet(s) of content via a user interface of a communication platform, as described herein.

Block 1402 illustrates receiving, from a user computing device of a user of a communication platform, a request to access a virtual space associated with the communication platform. In at least one example, a user of the user computing device 104 can interact with a user interface associated with the communication platform, such as the user interface 144, to request to access a virtual space associated with the communication platform. In some examples, the virtual space can be a communication channel, a workspace, a virtual space associated with particular types of data (e.g., unreads, snippets of content, boards, or the like), etc. associated with the communication platform. For instance, with reference to the user interface 144 shown and described in FIG. 2, the user can interact with a user interface element presented via the second sub-section 202 to access a virtual space associated with a communication channel. As another example, as shown and described in FIG. 10, the user can interact with a user interface element of the user interface element(s) 1000 to access a virtual space associated with snippets of content. FIG. 11 illustrates another example, wherein a user can interact with a user interface element of the user interface elements 1100 to request access to a virtual space associated with a particular type of data (e.g., snippets of content). Additional or alternative interactions and/or virtual spaces are within the scope of this disclosure.

Block 1404 illustrates causing user interface element(s) associated with snippet(s) of content to be presented via a user interface associated with the virtual space and/or communication platform. In at least one example, based at least in part on receiving the request, the content management component 118 can access the datastore 122 to determine (i) whether the user has access to the virtual space (e.g., as determined based at least in part on the user data 124 and/or permission data), (ii) whether users associated with the virtual space have a snippet of content available for viewing (e.g., as determined based at least in part on the user data 124, the channel data 128, and/or the content data 130), and/or (iii) where any of the available snippet(s) of content are new since the user last accessed the virtual space (e.g., as determined based at least in part on the user data 124, the channel data 128, and/or the content data 130). Based at least in part on a determination that the user has access to the virtual space and the users associated with the virtual space have snippet(s) of content available for viewing, the content management component 118 can cause user interface element(s) associated with snippet(s) of content to be presented via a user interface of the communication platform. As described and illustrated above, the user interface element(s) can be presented via the user interface in association with a communication channel, a workspace, or another virtual space of the communication platform. In some examples, the user interface element(s) can be presented via an aggregate presentation that is agnostic to particular communication channels, workspaces, or the like. As described and illustrated above, the user interface element(s) can be presented in various locations within the user interface, in various configurations, with various shapes, and/or in various orders. In some examples, the user interface element(s) can be arranged on the user interface by a date, a time, a topic, a communication channel, a workspace, a relevance metric, or the like. In some examples, if a snippet of content is new since the user last accessed the virtual space, an indication can be associated with the corresponding user interface element to indicate such.

Block 1406 illustrates receiving a request to view a snippet of content. In at least one example, the content management component 118 can receive a request to view a snippet of content. In some examples, a user can interact with a user interface element presented via the user interface. The application 140 can detect the interaction and send an indication of the interaction to the content management component. Such an indication can be a request for the snippet of content and the content management component 118 can receive the request and access the relevant snippet of content.

In some examples, the request can be associated with an input to a keyboard, or other input mechanism, to open a viewing user interface for viewing the one or more snippets of content. In such examples, the content management component 118 can select which snippet of content to present to the user. In some examples, the content management component 118 can select a snippet of content based at least in part on at least one of a date, a time, a topic, a communication channel, a workspace, a relevance metric, and/or the like. In some examples, the content management component 118 can select a snippet of content based on whether the snippet has been viewed by the requesting user. In some examples, the content management component 118 can determine an order for presenting multiple snippets of content responsive to receiving a request. In such examples, the content management component 118 can determine an order based at least in part on a date, a time, a topic, a communication channel, a workspace, a relevance metric, and/or the like.

Block 1408 illustrates causing the snippet of content to be presented via the user interface. In at least one example, the content management component 118 can cause the snippet of content to be presented via the user interface. In some examples, the content management component 118 can send the snippet of content to the user computing device 104 and the application 140 can output the snippet of content via the user interface. As described above, the snippet of content can be presented as a pop-up, an overlay, a new user interface, or the like. In some examples, the snippet of content can be associated with one or more mechanisms and/or selectable controls to enable viewers to interact with the snippet of content (e.g., provide a reaction, comment, or the like).

Block 1410 illustrates determining whether a new snippet of content is received. Based at least in part on determining that a new snippet of content is received (i.e., "yes" at block 1410), the content management component 118 can cause the user interface to be updated, as illustrated at block 1412. That is, based at least in part on receiving a new snippet of content, the content management component 118 can cause a new user interface element to be presented via the user interface, update an existing user interface element to indicate that a new snippet of content has been received, and/or otherwise make the new snippet of content available via the user interface. Based at least in part on determining that a new snippet of content is not received (i.e., "no" at block 1410), the process 1400 can return to block 1410 to await a new snippet of content.

Example Paragraphs

A. A method, implemented at least in part by a computing device of a channel-based communication platform, comprising: associating user identifiers with a communication channel of the channel-based communication platform, wherein based at least in part on associating the user identifiers with the communication channel, users associated with the user identifiers are members of the communication channel; associating one or more permissions with the user identifiers, the one or more permissions granting access to the members to interact with the communication channel by at least one of exchanging messages or sharing data via the communication channel; receiving, from a first user computing device of a first member of the members, a snippet of content to be presented via a user interface associated with the communication channel; causing a user interface element associated with the snippet of content to be presented via the user interface, wherein the user interface element is viewable by a second member of the members, and wherein the user interface element is presented in association with another user interface element associated with another snippet of content provided by another member of the communication channel; detecting, from a second user computing device of the second member, a selection of the user interface element; and causing the snippet of content to be displayed, by the second user computing device, via the user interface associated with the communication channel.

B. The method as paragraph A recites, wherein the snippet of content comprises at least one of audio content, haptic content, image content, or video content.

C. The method as paragraph A or B, wherein the snippet of content is accessible for a predetermined period of time, the method further comprising causing the user interface element to be removed from the user interface based at least in part on a determination that the predetermined period of time has lapsed.

D. The method as any of paragraphs A-C recites, wherein the snippet of content is accessible by the members of the communication channel asynchronously.

E. The method as any of paragraphs A-D recites, further comprising: in response to causing the snippet of content to be presented, receiving, from the second user computing device, a message associated with the snippet of content; and associating the message with the snippet of content, wherein the message is viewable by at least the first member.

F. The method as paragraph E recites, further comprising associating the message, and a representation of the snippet of content, with a direct message communication between the first member and the second member.

G. The method as any of paragraphs A-F recites, wherein the snippet of content is presented with a selectable control that, when selected, enables selection of a reaction from a menu of reactions, the method further comprising: receiving, from the second user computing device, an indication of a selection of the selectable control; causing the menu of reactions to be presented via the user interface on the second user computing device; receiving, from the second user computing device, an indication of a selection of the reaction from the menu of reactions; and associating an indication of the reaction with the snippet of content.

H. The method as paragraph G recites, further comprising causing the indication of the reaction to be presented in association with the snippet of content via the user interface when the snippet of content is viewed by other members of the communication channel.

I. The method as paragraph G or H recites, further comprising causing the indication of the reaction to be presented in association with the user interface element via the user interface.

J. The method as any of paragraphs G-I recites, wherein the second member is associated with a first permission that enables the second member to view the snippet of content and wherein a third member of the members is associated with a second permission, different than the first permission, that does not permit the third member to view the snippet of content.

K. A system associated with a channel-based communication platform, the system comprising: one or more processors; and one or more computer-readable media storing instructions that, when executed by the one or more processors, cause the system to perform operations comprising: based at least in part on a determination that a user of the channel-based communication platform is permitted to access one or more snippets of content provided by one or more other users of the channel-based communication platform, causing one or more user interface elements associated with the one or more snippets of content to be presented via a user interface of a user computing device of the user; receiving, from the user computing device, a request to view a snippet of content of the one or more snippets of content; and causing the snippet of content to be presented by the user computing device via the user interface associated with the channel-based communication platform.

L. The system as paragraph K recites, wherein the one or more user interface elements are presented via an aggregate presentation associated with at least one of multiple communication channels or multiple workspaces.

M. The system as paragraph L recites, wherein the one or more user interface elements are arranged on the user interface based on at least one of a date, a time, a topic, a communication channel, a workspace, or a relevance metric.

N. The system as any of paragraphs K-M recites, wherein the request to view the snippet of content is associated with an indication of an interaction with a user interface element, of the one or more user interface elements, associated with the snippet of content.

O. The system as any of paragraphs K-N recites, wherein the one or more user interface elements comprises at least two user interface elements, wherein the user interface element is associated with an indicator indicating that the snippet of content has not been viewed, and wherein another user interface element of the at least two interface elements, that has been previously viewed, is not associated with the indicator.

P. The system as any of paragraphs K-O recites, wherein based at least in part on receiving the request to view the snippet of content, causing each snippet of content of the one or more snippets of content to be presented by the user computing device without additional input from the user.

Q. The system as any of paragraphs K-P recites, wherein the one or more user interface elements are presented in at least one of a linear configuration, an overlapping configuration, or a collage, and wherein at least one user interface element of the one or more user interface elements is presented with at least one indication of a reaction provided in association with a snippet of content to which the at least one user interface element corresponds.

R. One or more computer-readable media storing instructions that, when executed by one or more processors, cause the one or more processors to perform operations comprising: based at least in part on a determination that a user of a channel-based communication platform is permitted to access one or more snippets of content provided by one or more other users of the channel-based communication platform, causing one or more user interface elements associated with the one or more snippets of content to be presented via a user interface of a user computing device of the user; receiving, from the user computing device, a request to view a snippet of content of the one or more snippets of content; and causing the snippet of content to be presented by the user computing device via the user interface associated with the channel-based communication platform.

S. The one or more computer-readable media as paragraph R recites, wherein the snippet of content is presented with a selectable control that, when selected, enables selection of a reaction from a menu of reactions, the operations further comprising: receiving, from the user computing device, an indication of a selection of the selectable control; causing the menu of reactions to be presented via the user interface on the user computing device; receiving, from the user computing device, an indication of a selection of the reaction from the menu of reactions; and causing the indication of the reaction to be presented in association with at least one of the user interface element or the snippet of content.

T. The one or more computer-readable media as paragraph R or S recites, wherein the user interface comprises a first region associated with one or more indications of one or more communication channels associated with the channel-based communication platform and a second region associated with a feed of a communication channel, wherein the one or more user interface elements are presented in association with the second region.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system associated with a channel-based communication platform, the system comprising:

one or more processors; and one or more computer-readable media storing instructions that, when executed by the one or more processors, cause the system to perform operations comprising:

causing one or more user interface elements associated with one or more snippets of content to be presented via a user interface of a client of a user of the channel-based communication platform, wherein the one or more snippets of content are presented via a virtual space of the channel-based communication platform, wherein the virtual space is accessible by members of the virtual space, including the user, and comprises at least one of a group-based communication channel, a group-based workspace, or a direct message, and wherein the one or more user interface elements are presented via an aggregate presentation within the user interface;

receiving, from the client, a request to view a snippet of content of the one or more snippets of content;

determining one or more permissions associated with the members, wherein the one or more permissions provide access to the one or more snippets by a first portion of the members and prevent access to the one or more snippets by a second portion of the members; and causing, based at least in part on a determination that the user is included in the first portion, the snippet of content to be presented by the client via the user interface.

2. The system as claim 1 recites, wherein the one or more user interface elements are arranged in the user interface based on at least one of a date, a time, a topic, a communication channel, a workspace, or a relevance metric.

3. The system as claim 1 recites, wherein the snippet of content is presented with a selectable control that, when selected, enables selection of a reaction from a menu of reactions, and the operations further comprising:

receiving a first indication of a first selection of the selectable control;

causing the menu of reactions to be presented via the user interface;

receiving a second indication of a second selection of the reaction from the menu of reactions; and causing the second indication to be presented in association with the one or more user interface elements.

4. The system as claim 3 recites, the operations further comprising causing the second indication to be presented in association with the snippet of content via the user interface when the snippet of content is viewed by one or more other users of the channel-based communication platform.

5. The system as claim 1 recites, the operations further comprising:

receiving a new snippet of content from the user or another user of the channel-based communication platform; and based at least in part on the determination, causing the new snippet of content to be presented via the user interface.

6. The system as claim 5 recites, the operations further comprising causing an updated user interface element associated with the new snippet of content to be presented via the user interface, wherein the updated user interface element is associated with the new snippet of content and a previously provided snippet of content.

7. The system as claim 5 recites, the operations further comprising causing a new user interface element associated with the new snippet of content to be presented via the user interface.

8. The system as claim 1 recites, wherein the one or more snippets of content are associated with a sequence, and the operations further comprising:

based at least in part on receiving the request to view the snippet of content, causing the one or more snippets of content to be presented in the sequence without further input from the user.

9. A method comprising:

causing one or more user interface elements associated with one or more snippets of content to be presented via a user interface of a client of a user of a channel-based communication platform, wherein the one or more snippets of content are presented via a virtual space of the channel-based communication platform, wherein the virtual space is accessible by members of the virtual space, including the user, and comprises at least one of a group-based communication channel, a group-based workspace, or a direct message, and wherein the one or more user interface elements are presented via an aggregate presentation within the user interface;

receiving, from the client, a request to view a snippet of content of the one or more snippets of content;

determining one or more permissions associated with the members, wherein the one or more permissions provide access to the one or more snippets by a first portion of the members and prevent access to the one or more snippets by a second portion of the members; and causing, based at least in part on a determination that the user is included in the first portion, the snippet of content to be presented by the client via the user interface.

10. The method as claim 9 recites, wherein the one or more user interface elements are arranged in the user interface based on at least one of a date, a time, a topic, a communication channel, a workspace, or a relevance metric.

11. The method as claim 9 recites, wherein the snippet of content is presented with a selectable control that, when selected, enables selection of a reaction from a menu of reactions, and the method further comprising:

receiving a first indication of a first selection of the selectable control;

causing the menu of reactions to be presented via the user interface;

receiving a second indication of a second selection of the reaction from the menu of reactions; and causing the second indication to be presented in association with the one or more user interface elements.

12. The method as claim 11 recites, further comprising causing the second indication to be presented in association with the snippet of content via the user interface when the snippet of content is viewed by one or more other users of the channel-based communication platform.

13. The method as claim 9 recites, further comprising:

receiving a new snippet of content from the user or another user of the channel-based communication platform; and based at least in part on the determination, causing the new snippet of content to be presented via the user interface.

14. The method as claim 13 recites, further comprising causing an updated user interface element associated with the new snippet of content to be presented via the user interface, wherein the updated user interface element is associated with the new snippet of content and a previously provided snippet of content.

15. The method as claim 13 recites, further comprising causing a new user interface element associated with the new snippet of content to be presented via the user interface.

16. The method as claim 9 recites, wherein the one or more snippets of content are associated with a sequence, the method further comprising:

based at least in part on receiving the request to view the snippet of content, causing the one or more snippets of content to be presented in the sequence without further input from the user.

17. One or more non-transitory computer-readable media storing instructions that, when executed by one or more processors, cause the one or more processors to perform operations comprising:

causing one or more user interface elements associated with one or more snippets of content to be presented via a user interface of a client of a user of a channel-based communication platform, wherein the one or more snippets of content are presented via a virtual space of the channel-based communication platform, wherein the virtual space is accessible by members of the virtual space, including the user, and comprises at least one of a group-based communication channel, a group-based workspace, or a direct message, and wherein the one or more user interface elements are presented via an aggregate presentation within the user interface;

receiving, from the client, a request to view a snippet of content of the one or more snippets of content;

determining one or more permissions associated with the members, wherein the one or more permissions provide access to the one or more snippets by a first portion of the members and prevent access to the one or more snippets by a second portion of the members; and causing, based at least in part on a determination that the user is included in the first portion, the snippet of content to be presented by the client via the user interface.

18. The one or more non-transitory computer-readable media as claim 17 recites, wherein the one or more user interface elements are arranged in the user interface based on at least one of a date, a time, a topic, a communication channel, a workspace, or a relevance metric.

19. The one or more non-transitory computer-readable media as claim 17 recites, wherein the snippet of content is presented with a selectable control that, when selected, enables selection of a reaction from a menu of reactions, and the operations further comprising:

receiving a first indication of a first selection of the selectable control;

causing the menu of reactions to be presented via the user interface;

receiving a second indication of a second selection of the reaction from the menu of reactions; and causing the second indication to be presented in association with the one or more user interface elements.

20. The one or more non-transitory computer-readable media as claim 19 recites, the operations further comprising causing the second indication to be presented in association with the snippet of content via the user interface when the snippet of content is viewed by the one or more other users of the channel-based communication platform.

* * * * *